United States Patent
Hunter et al.

(10) Patent No.: US 8,090,619 B1
(45) Date of Patent: Jan. 3, 2012

(54) METHOD AND SYSTEM FOR MUSIC DISTRIBUTION

(75) Inventors: Charles Eric Hunter, Hilton Head Island, SC (US); Bernard L. Ballou, Jr., Raleigh, NC (US); Kelly C. Sparks, Raleigh, NC (US); John H. Hebrank, Durham, NC (US)

(73) Assignee: Ochoa Optics LLC, Las Vegas, NV (US)

( * ) Notice: Subject to any disclaimer, the term of this patent is extended or adjusted under 35 U.S.C. 154(b) by 2785 days.

(21) Appl. No.: 09/707,273

(22) Filed: Nov. 6, 2000

Related U.S. Application Data

(63) Continuation-in-part of application No. 09/385,671, filed on Aug. 27, 1999, now abandoned, and a continuation-in-part of application No. 09/436,281, filed on Nov. 8, 1999, now abandoned, and a continuation-in-part of application No. 09/476,078, filed on Dec. 30, 1999, now abandoned, and a continuation-in-part of application No. 09/487,978, filed on Jan. 20, 2000, now Pat. No. 6,952,685, and a continuation-in-part of application No. 09/493,854, filed on Jan. 28, 2000, now abandoned, and a continuation-in-part of application No. 09/502,069, filed on Feb. 10, 2000, now Pat. No. 6,647,417, and a continuation-in-part of application No. 09/684,442, filed on Oct. 6, 2000, now Pat. No. 7,370,016.

(51) Int. Cl.
*G06Q 30/00* (2006.01)
*G06F 17/30* (2006.01)

(52) U.S. Cl. .................. 705/26.1; 705/26.61; 705/26.8; 705/27.1; 705/51; 705/52; 705/59

(58) Field of Classification Search .............. 705/26–29, 705/51–59, 1, 22, 34; 84/600, 609, 610, 84/649, 650, 483.1; 700/83, 94; 725/42, 725/76; 709/225
See application file for complete search history.

(56) References Cited

U.S. PATENT DOCUMENTS 3,373,517 A    3/1968 Halperin
(Continued)

FOREIGN PATENT DOCUMENTS

EP    0 683 943 B1    11/1993
(Continued)

OTHER PUBLICATIONS

"MP3 All in One". Jul. 23, 1999. By Martyn Williams. Newsbytes, p. NA.*

(Continued)

*Primary Examiner* — William Allen
(74) *Attorney, Agent, or Firm* — Woodcock Washburn LLP

(57) ABSTRACT

Music is blanket transmitted (for example, via satellite downlink transmission) to each customer's user station where selected music files are recorded. Customers preselect from a list of available music in advance using an interactive screen selector, and pay only for music that they choose to playback for their enjoyment. An antipiracy "ID tag" is woven into the recorded music so that any illegal copies therefrom may be traced to the purchase transaction. Music is transmitted on a fixed schedule or through an active scheduling process that monitors music requests from all or a subset of satellite receivers and adjust scheduling according to demand for various CD's. Receivers store selections that are likely to be preferred by a specific customer. In those instances where weather conditions, motion of atmospheric layers or dish obstructions result in data loss, the system downloads the next transmission of the requested CD and uses both transmissions to produce a "good copy". In conjunction with the blanket 20 transmission of more popular music, an automated CD manufacturing facility may be provided to manufacture CD's that are not frequently requested and distribute them by ground transportation.

29 Claims, 16 Drawing Sheets

U.S. PATENT DOCUMENTS

| | | | |
|---|---|---|---|
| 3,376,465 A | 4/1968 | Corpew | |
| 3,848,193 A | 11/1974 | Martin et al. | 325/53 |
| 3,941,926 A | 3/1976 | Slobodzian et al. | 178/7.3 |
| 3,983,317 A | 9/1976 | Glorioso | 178/6.6 |
| 3,993,955 A | 11/1976 | Belcher et al. | 325/308 |
| 4,071,857 A | 1/1978 | Whitney et al. | |
| 4,094,010 A | 6/1978 | Pepperl et al. | 365/215 |
| 4,155,042 A | 5/1979 | Permut et al. | 325/64 |
| 4,230,990 A | 10/1980 | Lert, et al. | |
| 4,332,022 A | 5/1982 | Ceshkovsky et al. | 369/44 |
| 4,368,485 A | 1/1983 | Midland | 358/64 |
| 4,476,488 A | 10/1984 | Merrell | 358/86 |
| 4,536,791 A | 8/1985 | Campbell et al. | 358/122 |
| 4,554,584 A | 11/1985 | Plotnick, et al. | |
| 4,559,480 A | 12/1985 | Nobs | 315/324 |
| 4,575,750 A | 3/1986 | Callahan | 358/86 |
| 4,595,950 A | 6/1986 | Lofberg | 358/122 |
| 4,613,901 A | 9/1986 | Gilhousen et al. | |
| 4,654,482 A | 3/1987 | DeAngelis | 379/95 |
| 4,716,410 A | 12/1987 | Nozaki | 340/825.52 |
| 4,734,779 A | 3/1988 | Levis et al. | 358/231 |
| 4,734,858 A | 3/1988 | Schlafly | |
| 4,761,641 A | 8/1988 | Schreiber | 340/717 |
| 4,766,581 A | 8/1988 | Korn et al. | |
| 4,789,863 A * | 12/1988 | Bush | 340/5.9 |
| 4,794,465 A | 12/1988 | Van Luyt et al. | 386/104 |
| 4,797,913 A | 1/1989 | Kaplan et al. | 379/91 |
| 4,809,325 A | 2/1989 | Hayashi et al. | 380/234 |
| 4,812,843 A | 3/1989 | Champion, III et al. | 340/905 |
| 4,829,569 A | 5/1989 | Seth-Smith et al. | 380/10 |
| 4,845,700 A | 7/1989 | Koizumi et al. | |
| 4,847,825 A | 7/1989 | Levine | 369/47 |
| 4,862,268 A | 8/1989 | Campbell et al. | 358/141 |
| 4,908,713 A | 3/1990 | Levine | 358/335 |
| 4,949,187 A | 8/1990 | Cohen | 358/335 |
| 5,046,090 A | 9/1991 | Walker et al. | 380/5 |
| 5,051,822 A | 9/1991 | Rhoades | 358/86 |
| 5,073,925 A | 12/1991 | Nagata et al. | 380/3 |
| 5,105,418 A | 4/1992 | Kenmotsu et al. | |
| 5,107,107 A | 4/1992 | Osborne | 250/231.14 |
| 5,121,430 A | 6/1992 | Ganzer et al. | 380/48 |
| 5,123,046 A | 6/1992 | Levine | 380/10 |
| 5,133,079 A | 7/1992 | Ballantyne et al. | 455/4.1 |
| 5,182,669 A | 1/1993 | Chikuma et al. | 359/241 |
| 5,191,573 A | 3/1993 | Hair | 369/84 |
| 5,214,793 A | 5/1993 | Conway et al. | 455/49.1 |
| 5,233,423 A | 8/1993 | Jernigan et al. | 358/181 |
| 5,235,587 A | 8/1993 | Bearden et al. | 369/106 |
| 5,251,193 A | 10/1993 | Nelson et al. | 369/44.12 |
| 5,257,017 A | 10/1993 | Jones et al. | 345/13 |
| 5,260,778 A | 11/1993 | Kauffman et al. | 358/86 |
| 5,274,762 A | 12/1993 | Peterson et al. | |
| 5,283,731 A | 2/1994 | LaLonde et al. | |
| 5,292,568 A | 3/1994 | Tezuka et al. | |
| 5,297,204 A | 3/1994 | Levine | 380/10 |
| 5,311,423 A | 5/1994 | Clark | |
| 5,319,735 A | 6/1994 | Preuss et al. | |
| 5,355,302 A | 10/1994 | Martin et al. | |
| 5,365,282 A | 11/1994 | Levine | 348/734 |
| 5,373,330 A | 12/1994 | Levine | 348/734 |
| 5,387,942 A | 2/1995 | Lemelson | |
| 5,393,993 A | 2/1995 | Edmond et al. | |
| 5,410,344 A | 4/1995 | Graves et al. | 725/46 |
| 5,414,756 A | 5/1995 | Levine | 379/67 |
| 5,418,713 A | 5/1995 | Allen | |
| 5,420,647 A | 5/1995 | Levine | 348/734 |
| 5,420,923 A | 5/1995 | Beyers, II et al. | 380/20 |
| 5,428,606 A | 6/1995 | Moskowitz | 370/60 |
| 5,438,355 A | 8/1995 | Palmer | 725/110 |
| 5,440,334 A | 8/1995 | Walters et al. | 725/92 |
| 5,465,291 A | 11/1995 | Barrus et al. | 379/67 |
| 5,469,020 A | 11/1995 | Herrick | 313/511 |
| 5,469,206 A | 11/1995 | Strubbe et al. | 725/60 |
| 5,473,584 A | 12/1995 | Oshima | 369/32 |
| 5,483,278 A | 1/1996 | Strubbe et al. | 725/61 |
| 5,483,535 A * | 1/1996 | McMillen et al. | 370/452 |
| 5,486,819 A | 1/1996 | Horie | 340/905 |
| 5,495,283 A | 2/1996 | Cowe | 348/9 |
| 5,497,186 A | 3/1996 | Kawasaki | 348/6 |
| 5,497,479 A | 3/1996 | Hornbuckle | |
| 5,508,815 A | 4/1996 | Levine | 358/335 |
| 5,512,935 A | 4/1996 | Majeti et al. | 348/9 |
| 5,513,260 A | 4/1996 | Ryan | 380/3 |
| 5,530,751 A | 6/1996 | Morris | 380/4 |
| 5,532,920 A | 7/1996 | Hartrick et al. | |
| 5,543,856 A | 8/1996 | Rosser et al. | 348/578 |
| 5,545,454 A | 8/1996 | Yamada et al. | |
| 5,550,863 A | 8/1996 | Yurt et al. | 375/240 |
| 5,557,541 A * | 9/1996 | Schulhof et al. | 700/94 |
| 5,559,549 A | 9/1996 | Hendricks et al. | 348/6 |
| 5,565,909 A | 10/1996 | Thibadeau et al. | 348/9 |
| 5,566,315 A | 10/1996 | Milillo et al. | 711/113 |
| 5,568,272 A | 10/1996 | Levine | 386/48 |
| 5,572,442 A * | 11/1996 | Schulhof et al. | 709/219 |
| 5,592,511 A | 1/1997 | Schoen et al. | 375/220 |
| 5,592,551 A | 1/1997 | Lett et al. | 380/20 |
| 5,592,626 A | 1/1997 | Papadimitriou et al. | |
| 5,598,397 A | 1/1997 | Sim | |
| 5,600,839 A | 2/1997 | MacDonald | |
| 5,610,653 A | 3/1997 | Abecassis | 348/170 |
| 5,612,741 A | 3/1997 | Loban et al. | 348/383 |
| 5,619,247 A * | 4/1997 | Russo | 725/104 |
| 5,621,840 A | 4/1997 | Kawamura et al. | 386/68 |
| 5,621,863 A | 4/1997 | Boulet et al. | |
| 5,627,895 A | 5/1997 | Owaki | 380/54 |
| 5,628,050 A | 5/1997 | McGraw et al. | 455/12.1 |
| 5,630,067 A | 5/1997 | Kindell et al. | |
| 5,638,113 A | 6/1997 | Lappington et al. | 348/12 |
| 5,640,453 A | 6/1997 | Schuchman et al. | 380/10 |
| 5,644,859 A | 7/1997 | Hsu | 40/545 |
| 5,646,603 A | 7/1997 | Nagata et al. | 340/825.25 |
| 5,646,997 A | 7/1997 | Barton | 380/23 |
| 5,654,747 A | 8/1997 | Ottesen et al. | 348/12 |
| 5,659,366 A | 8/1997 | Kerman | 348/460 |
| 5,659,613 A | 8/1997 | Copeland et al. | 380/3 |
| 5,661,516 A | 8/1997 | Carles | 348/8 |
| 5,664,018 A | 9/1997 | Leighton | 380/54 |
| 5,675,734 A | 10/1997 | Hair | |
| 5,682,206 A | 10/1997 | Wehmeyer et al. | 725/58 |
| 5,684,918 A | 11/1997 | Abecassis | 386/83 |
| 5,686,954 A | 11/1997 | Yoshinobu et al. | 348/13 |
| 5,689,799 A | 11/1997 | Dougherty et al. | 455/2 |
| 5,692,214 A | 11/1997 | Levine | |
| 5,694,551 A * | 12/1997 | Doyle et al. | 705/26 |
| 5,701,161 A | 12/1997 | Williams et al. | 348/468 |
| 5,701,383 A | 12/1997 | Russo et al. | 386/46 |
| 5,701,397 A | 12/1997 | Steimle et al. | |
| 5,710,869 A | 1/1998 | Godefray et al. | |
| 5,717,814 A | 2/1998 | Abecassis | 386/46 |
| 5,717,832 A | 2/1998 | Steimle et al. | |
| 5,721,827 A | 2/1998 | Logan et al. | 395/200.47 |
| 5,721,951 A | 2/1998 | DorEl | |
| 5,724,062 A | 3/1998 | Hunter | 345/102 |
| 5,724,091 A | 3/1998 | Freeman et al. | 348/13 |
| 5,724,525 A | 3/1998 | Beyers, II et al. | |
| 5,729,214 A | 3/1998 | Moore | 340/905 |
| 5,734,413 A | 3/1998 | Lappington et al. | 348/12 |
| 5,734,720 A | 3/1998 | Salganicoff | 380/211 |
| 5,734,781 A | 3/1998 | Cantone | 386/46 |
| 5,740,326 A | 4/1998 | Boulet et al. | |
| 5,745,569 A | 4/1998 | Moskowitz et al. | |
| 5,748,716 A | 5/1998 | Levine | 379/102.03 |
| 5,758,257 A | 5/1998 | Herz et al. | 455/2 |
| 5,760,820 A | 6/1998 | Eda et al. | 348/9 |
| 5,761,606 A | 6/1998 | Wolzien | 455/6.2 |
| 5,761,721 A | 6/1998 | Baldus et al. | 711/141 |
| 5,771,334 A | 6/1998 | Yamauchi et al. | |
| 5,781,734 A | 7/1998 | Ohno et al. | |
| 5,790,202 A | 8/1998 | Kummer et al. | 348/553 |
| 5,790,935 A | 8/1998 | Payton | 422/186 |
| 5,790,937 A | 8/1998 | Gutle | 455/6.3 |
| 5,799,285 A | 8/1998 | Klingman | 705/26 |
| 5,805,154 A | 9/1998 | Brown | 345/327 |
| 5,805,763 A | 9/1998 | Lawler et al. | 386/83 |
| 5,809,139 A | 9/1998 | Girod et al. | 380/5 |
| 5,815,484 A | 9/1998 | Smith et al. | |
| 5,815,662 A | 9/1998 | Ong | 725/92 |

| Patent | Kind | Date | Inventor | Class |
|---|---|---|---|---|
| 5,818,806 | A | 10/1998 | Wong et al. | 369/59 |
| 5,822,291 | A | 10/1998 | Brindze et al. | 369/94 |
| 5,822,432 | A | 10/1998 | Moskowitz et al. | 380/28 |
| 5,825,407 | A | 10/1998 | Cowe et al. | 348/6 |
| 5,826,123 | A | 10/1998 | Lai | 396/446 |
| 5,828,402 | A | 10/1998 | Collings | |
| RE35,954 | E | 11/1998 | Levine | 380/10 |
| 5,832,287 | A | 11/1998 | Atalla | |
| 5,835,896 | A | 11/1998 | Fisher et al. | 705/37 |
| 5,841,979 | A | 11/1998 | Schulhof et al. | |
| 5,845,083 | A | 12/1998 | Hamadani et al. | |
| 5,848,129 | A | 12/1998 | Baker | 379/67 |
| 5,848,155 | A | 12/1998 | Cox | 380/4 |
| 5,848,352 | A | 12/1998 | Dougherty et al. | 455/5.1 |
| 5,854,779 | A | 12/1998 | Johnson et al. | 369/59 |
| 5,857,020 | A | 1/1999 | Peterson, Jr. | 705/52 |
| 5,860,068 | A | 1/1999 | Cook | 705/26 |
| 5,862,260 | A | 1/1999 | Rhoads | 382/232 |
| 5,870,717 | A | 2/1999 | Wiecha | 705/26 |
| 5,874,985 | A | 2/1999 | Matthews, III | 348/7 |
| 5,878,017 | A | 3/1999 | Ikegame | |
| 5,884,284 | A * | 3/1999 | Peters et al. | 705/30 |
| 5,889,868 | A | 3/1999 | Moskowitz et al. | 380/51 |
| 5,890,136 | A | 3/1999 | Kipp | 705/22 |
| 5,897,622 | A | 4/1999 | Blinn et al. | 705/26 |
| 5,898,384 | A | 4/1999 | Alt et al. | 340/825.36 |
| 5,899,980 | A | 5/1999 | Wilf et al. | 705/26 |
| 5,903,262 | A | 5/1999 | Ichihashi et al. | |
| 5,903,878 | A | 5/1999 | Talati | 705/26 |
| 5,905,713 | A | 5/1999 | Anderson et al. | 370/241 |
| 5,905,800 | A | 5/1999 | Moskowitz et al. | 380/28 |
| 5,909,492 | A | 6/1999 | Payne et al. | 380/24 |
| 5,914,712 | A | 6/1999 | Sartain et al. | |
| 5,914,774 | A | 6/1999 | Ota | |
| 5,915,018 | A | 6/1999 | Aucsmith | 380/201 |
| 5,915,027 | A | 6/1999 | Cox et al. | 380/54 |
| 5,915,068 | A | 6/1999 | Levine | 386/83 |
| 5,918,213 | A | 6/1999 | Bernard et al. | 705/26 |
| 5,930,369 | A | 7/1999 | Cox et al. | 380/54 |
| 5,931,901 | A | 8/1999 | Wolfe et al. | 709/206 |
| 5,933,499 | A | 8/1999 | Enari | |
| 5,933,798 | A | 8/1999 | Linnartz | 702/191 |
| 5,934,795 | A | 8/1999 | Rykowski et al. | 362/309 |
| 5,940,135 | A | 8/1999 | Petrovic et al. | 348/473 |
| 5,940,807 | A | 8/1999 | Purcell | 705/26 |
| 5,943,670 | A | 8/1999 | Prager | 707/5 |
| 5,946,665 | A | 8/1999 | Suzuki et al. | 705/26 |
| 5,949,885 | A | 9/1999 | Leighton | 380/54 |
| 5,956,716 | A | 9/1999 | Kenner et al. | 707/10 |
| 5,959,885 | A | 9/1999 | Kameswara | 365/185.07 |
| 5,959,945 | A * | 9/1999 | Kleiman | 381/81 |
| 5,960,081 | A | 9/1999 | Vynne et al. | 380/10 |
| 5,960,411 | A | 9/1999 | Hartman et al. | 705/26 |
| 5,963,217 | A | 10/1999 | Grayson et al. | 345/473 |
| 5,963,264 | A | 10/1999 | Jackson | 348/460 |
| 5,963,915 | A | 10/1999 | Kirsch | 705/26 |
| 5,963,917 | A | 10/1999 | Ogram | 705/26 |
| 5,966,440 | A | 10/1999 | Hair | 380/4 |
| 5,966,697 | A | 10/1999 | Fergerson et al. | 705/26 |
| 5,969,283 | A | 10/1999 | Looney et al. | 84/609 |
| 5,969,715 | A | 10/1999 | Dougherty et al. | 345/327 |
| 5,970,471 | A | 10/1999 | Hill | 705/26 |
| 5,970,472 | A | 10/1999 | Allsop et al. | 705/26 |
| 5,970,473 | A | 10/1999 | Gerszberg et al. | 705/26 |
| 5,970,474 | A | 10/1999 | LeRoy et al. | 705/27 |
| 5,970,475 | A | 10/1999 | Barnes et al. | 705/27 |
| 5,974,396 | A | 10/1999 | Anderson et al. | 705/10 |
| 5,978,775 | A | 11/1999 | Chen | 705/26 |
| 5,983,199 | A | 11/1999 | Kaneko | 705/26 |
| 5,983,200 | A | 11/1999 | Slotznick | 705/26 |
| 5,983,201 | A | 11/1999 | Fay | 705/27 |
| 5,988,078 | A | 11/1999 | Levine | 110/8 |
| 5,991,399 | A | 11/1999 | Graunke et al. | 380/4 |
| 5,992,888 | A | 11/1999 | North et al. | 283/56 |
| 6,002,772 | A | 12/1999 | Saito | 380/49 |
| 6,005,938 | A * | 12/1999 | Banker et al. | 380/239 |
| 6,006,332 | A | 12/1999 | Rabne et al. | 713/201 |
| 6,011,722 | A | 1/2000 | Bude et al. | |
| 6,012,086 | A | 1/2000 | Lowell | 709/218 |
| 6,013,007 | A | 1/2000 | Root et al. | 482/8 |
| 6,014,491 | A | 1/2000 | Hair | 386/31 |
| 6,023,451 | A | 2/2000 | Kashiwagi et al. | |
| 6,025,868 | A | 2/2000 | Russo | 348/3 |
| 6,029,045 | A | 2/2000 | Picco et al. | 725/34 |
| 6,029,141 | A | 2/2000 | Bezos et al. | 725/27 |
| 6,032,130 | A | 2/2000 | Alloul et al. | 705/27 |
| 6,041,316 | A | 3/2000 | Allen | |
| 6,044,047 | A * | 3/2000 | Kulas | 369/34.01 |
| 6,052,554 | A | 4/2000 | Hendricks et al. | 455/5.1 |
| 6,061,440 | A * | 5/2000 | Delaney et al. | 379/202.01 |
| 6,064,980 | A | 5/2000 | Jacobi et al. | 705/26 |
| 6,067,107 | A | 5/2000 | Travaille et al. | 348/1 |
| 6,067,532 | A | 5/2000 | Gebb | 705/37 |
| 6,069,868 | A | 5/2000 | Kashiwagi | 369/275.1 |
| 6,072,982 | A | 6/2000 | Haddad | |
| 6,073,372 | A | 6/2000 | Davis | 40/124.16 |
| 6,081,785 | A | 6/2000 | Oshima et al. | 705/1 |
| 6,088,455 | A | 7/2000 | Logan et al. | 380/200 |
| 6,088,722 | A | 7/2000 | Herz et al. | 709/217 |
| 6,091,883 | A | 7/2000 | Artigalas et al. | 386/83 |
| 6,112,192 | A | 8/2000 | Capek | |
| 6,115,348 | A | 9/2000 | Guerra | 369/112 |
| 6,118,976 | A | 9/2000 | Arias et al. | |
| 6,119,096 | A | 9/2000 | Mann et al. | 705/5 |
| 6,122,403 | A | 9/2000 | Rhoads | |
| 6,131,130 | A | 10/2000 | Van Ryzin | |
| 6,141,530 | A * | 10/2000 | Rabowsky | 725/116 |
| 6,147,715 | A | 11/2000 | Yuen et al. | 348/565 |
| 6,148,033 | A | 11/2000 | Pearlstein et al. | |
| 6,148,142 | A | 11/2000 | Anderson | 386/125 |
| 6,148,428 | A | 11/2000 | Welch et al. | 714/752 |
| 6,150,964 | A | 11/2000 | McLaughlin | 341/59 |
| 6,151,600 | A | 11/2000 | Dedrick | 707/10 |
| 6,175,840 | B1 | 1/2001 | Chen et al. | 707/501.1 |
| 6,177,931 | B1 | 1/2001 | Alexander et al. | 725/52 |
| 6,198,875 | B1 | 3/2001 | Edenson et al. | 386/94 |
| 6,201,777 | B1 | 3/2001 | Tsuchiya et al. | |
| 6,209,787 | B1 * | 4/2001 | Iida | 235/381 |
| 6,226,618 | B1 | 5/2001 | Downs et al. | 705/1 |
| 6,228,440 | B1 | 5/2001 | Dailey et al. | |
| 6,229,453 | B1 * | 5/2001 | Gardner et al. | 340/853.8 |
| 6,233,389 | B1 | 5/2001 | Barton et al. | 386/46 |
| 6,233,682 | B1 | 5/2001 | Fritsch | 713/168 |
| 6,236,760 | B1 | 5/2001 | Bagni et al. | |
| 6,238,763 | B1 | 5/2001 | Sandstrom | |
| 6,240,401 | B1 | 5/2001 | Oren et al. | 705/40 |
| 6,243,350 | B1 | 6/2001 | Knight et al. | |
| 6,247,047 | B1 * | 6/2001 | Wolff | 709/219 |
| 6,247,130 | B1 * | 6/2001 | Fritsch | 713/171 |
| 6,249,532 | B1 | 6/2001 | Yoshikawa et al. | 370/486 |
| 6,265,424 | B1 | 7/2001 | Tisdell et al. | 546/272.4 |
| 6,269,394 | B1 | 7/2001 | Kenner et al. | 709/217 |
| 6,272,636 | B1 | 8/2001 | Neville et al. | 713/189 |
| 6,288,753 | B1 | 9/2001 | DeNicola et al. | |
| 6,343,738 | B1 | 2/2002 | Ogilivie | |
| 6,363,356 | B1 | 3/2002 | Horstmann | 705/26 |
| 6,385,596 | B1 * | 5/2002 | Wiser et al. | 705/51 |
| 6,400,996 | B1 | 6/2002 | Hoffberg et al. | 700/83 |
| 6,405,203 | B1 * | 6/2002 | Collart | 707/10 |
| 6,408,313 | B1 | 6/2002 | Campbell et al. | 707/205 |
| 6,424,998 | B2 | 7/2002 | Hunter | 709/207 |
| 6,430,603 | B2 | 8/2002 | Hunter | 709/207 |
| 6,430,605 | B2 | 8/2002 | Hunter | 709/207 |
| 6,438,579 | B1 | 8/2002 | Hosken | 709/203 |
| 6,453,420 | B1 * | 9/2002 | Collart | 726/26 |
| 6,463,467 | B1 | 10/2002 | Mages et al. | 709/218 |
| 6,496,822 | B2 | 12/2002 | Rosenfelt et al. | 707/9 |
| 6,504,798 | B1 | 1/2003 | Revis | |
| 6,510,177 | B1 | 1/2003 | De Bonet et al. | |
| 6,519,341 | B1 | 2/2003 | Enari | 380/217 |
| 6,519,571 | B1 | 2/2003 | Guheen et al. | |
| 6,522,769 | B1 | 2/2003 | Rhoads et al. | 382/100 |
| 6,529,526 | B1 | 3/2003 | Schneidewend | |
| 6,574,424 | B1 | 6/2003 | Dimitri et al. | |
| 6,606,744 | B1 * | 8/2003 | Mikurak | 717/174 |
| 6,611,820 | B2 | 8/2003 | Oshima et al. | 705/56 |
| 6,621,933 | B2 | 9/2003 | Chung et al. | |
| 6,625,333 | B1 | 9/2003 | Wang et al. | 382/300 |

| | | |
|---|---|---|
| 6,637,029 B1 | 10/2003 | Maissal et al. |
| 6,641,886 B1 | 11/2003 | Bakos et al. |
| 6,662,231 B1 | 12/2003 | Drosset et al. |
| 6,697,948 B1 * | 2/2004 | Rabin et al. ............... 726/30 |
| 6,718,551 B1 | 4/2004 | Swix et al. |
| 6,728,271 B1 | 4/2004 | Kawamura et al. |
| 6,728,713 B1 | 4/2004 | Beach et al. ............... 707/10 |
| 6,732,366 B1 | 5/2004 | Russo ............... 725/5 |
| 6,735,251 B2 | 5/2004 | Sugahara ............ 375/240.01 |
| 6,756,997 B1 | 6/2004 | Ward et al. |
| 6,760,442 B1 | 7/2004 | Scott |
| 6,769,020 B2 | 7/2004 | Miyazaki et al. ......... 709/219 |
| 6,772,331 B1 | 8/2004 | Hind et al. |
| 6,778,678 B1 | 8/2004 | Podilchuk et al. |
| 6,783,886 B1 | 8/2004 | Hunter et al. |
| 6,792,007 B1 * | 9/2004 | Hamada et al. ............ 370/542 |
| 6,799,326 B2 | 9/2004 | Boylan et al. |
| 6,810,131 B2 | 10/2004 | Nakagawa et al. |
| 6,829,301 B1 | 12/2004 | Tinker et al. |
| 6,829,368 B2 | 12/2004 | Meyer et al. ............... 382/100 |
| 6,842,522 B1 | 1/2005 | Downing |
| 6,850,901 B1 | 2/2005 | Hunter et al. |
| 6,881,465 B2 | 4/2005 | Ogawa et al. |
| 6,882,979 B1 * | 4/2005 | Reay et al. ............... 705/26 |
| 6,889,383 B1 | 5/2005 | Jarman |
| 6,928,423 B1 * | 8/2005 | Yamanaka ............... 705/50 |
| 6,931,534 B1 | 8/2005 | Jandel et al. |
| 6,931,657 B1 | 8/2005 | Marsh |
| 6,944,600 B2 | 9/2005 | Stefik et al. ............... 705/51 |
| 6,948,070 B1 * | 9/2005 | Ginter et al. ............... 713/193 |
| 6,956,833 B1 | 10/2005 | Yukie et al. |
| 6,959,220 B1 * | 10/2005 | Wiser et al. ............... 700/94 |
| 6,990,678 B2 | 1/2006 | Zigmond ............... 725/109 |
| 7,006,974 B1 | 2/2006 | Burchard et al. |
| 7,032,237 B2 | 4/2006 | Tsunoda et al. |
| 7,047,302 B1 | 5/2006 | Chatani et al. |
| 7,120,800 B2 | 10/2006 | Ginter et al. |
| 7,130,892 B2 | 10/2006 | Mukai ............... 705/26 |
| 7,155,733 B2 | 12/2006 | Rodriguez et al. |
| 7,169,334 B2 | 1/2007 | Yamamoto et al. |
| 7,191,153 B1 | 3/2007 | Braitberg et al. |
| 7,197,758 B1 | 3/2007 | Blackketter et al. |
| 7,233,781 B2 | 6/2007 | Hunter et al. ............... 455/404.1 |
| 7,263,188 B2 | 8/2007 | Kohno |
| 7,263,497 B1 * | 8/2007 | Wiser et al. ............... 705/26 |
| 7,269,634 B2 | 9/2007 | Getsin et al. |
| 7,313,802 B1 | 12/2007 | Tomsen |
| 7,428,639 B2 | 9/2008 | Demos |
| 7,447,907 B2 | 11/2008 | Hart et al. |
| 7,487,128 B2 | 2/2009 | Spagna et al. |
| 7,499,564 B2 | 3/2009 | Rhoads |
| 7,532,725 B2 | 5/2009 | Moskowitz et al. |
| 7,539,110 B2 | 5/2009 | Mizuno et al. |
| 2001/0002852 A1 | 6/2001 | Kwoh ............... 348/465 |
| 2001/0003846 A1 | 6/2001 | Rowe et al. ............... 725/47 |
| 2001/0005906 A1 | 6/2001 | Humpleman ............... 725/82 |
| 2001/0010045 A1 | 7/2001 | Stefik et al. ............... 705/51 |
| 2001/0010095 A1 | 7/2001 | Ellis et al. ............... 725/44 |
| 2001/0013037 A1 | 8/2001 | Matsumoto ............... 707/5 |
| 2001/0013120 A1 | 8/2001 | Tsukamoto ............... 725/5 |
| 2001/0014882 A1 | 8/2001 | Stefik et al. ............... 705/51 |
| 2001/0016836 A1 | 8/2001 | Boccon-Gibod et al. ....... 705/52 |
| 2001/0017920 A1 | 8/2001 | Son et al. ............... 380/212 |
| 2001/0018742 A1 | 8/2001 | Hirai ............... 713/193 |
| 2001/0018858 A1 | 9/2001 | Dwek ............... 84/609 |
| 2001/0023416 A1 | 9/2001 | Hosokawa ............... 5/51 |
| 2001/0023417 A1 | 9/2001 | Stefik et al. ............... 705/57 |
| 2001/0023428 A1 | 9/2001 | Miyazaki et al. ......... 709/201 |
| 2001/0024425 A1 | 9/2001 | Tsunoda et al. ............ 370/82 |
| 2001/0024566 A1 | 9/2001 | Mankovitz ............... 386/83 |
| 2001/0025259 A1 | 9/2001 | Rouchon ............... 5/26 |
| 2001/0025269 A1 | 9/2001 | Otsuka ............... 705/52 |
| 2001/0025316 A1 | 9/2001 | Oh ............... 709/231 |
| 2001/0027561 A1 | 10/2001 | White et al. ............... 725/1 |
| 2001/0027563 A1 | 10/2001 | White et al. ............... 725/46 |
| 2001/0029491 A1 | 10/2001 | Yoneta et al. ............... 705/53 |
| 2001/0029538 A1 | 10/2001 | Blockton et al. ............ 709/226 |
| 2001/0029583 A1 | 10/2001 | Palatov et al. ............ 713/193 |
| 2001/0030660 A1 | 10/2001 | Zainoulline ............... 345/720 |
| 2001/0031066 A1 | 10/2001 | Meyer et al. ............... 382/100 |
| 2001/0032131 A1 | 10/2001 | Mowry ............... 705/14 |
| 2001/0032132 A1 | 10/2001 | Moran ............... 705/14 |
| 2001/0032133 A1 | 10/2001 | Moran ............... 705/14 |
| 2001/0032187 A1 | 10/2001 | Nuttall ............... 705/57 |
| 2001/0032312 A1 | 10/2001 | Runje et al. ............... 713/172 |
| 2001/0034635 A1 | 10/2001 | Winters ............... 705/10 |
| 2001/0034714 A1 | 10/2001 | Terao et al. ............... 705/57 |
| 2001/0034883 A1 | 10/2001 | Zigmond ............... 725/109 |
| 2001/0042043 A1 | 11/2001 | Shear et al. |
| 2001/0047298 A1 | 11/2001 | Moore et al. ............... 705/14 |
| 2002/0028024 A1 | 3/2002 | Jayant et al. |
| 2002/0056112 A1 | 5/2002 | Dureau et al. ............... 725/78 |
| 2002/0056118 A1 | 5/2002 | Hunter et al. ............... 725/87 |
| 2002/0057799 A1 | 5/2002 | Kohno ............... 380/228 |
| 2002/0062261 A1 | 5/2002 | Mukai ............... 705/26 |
| 2002/0066025 A1 | 5/2002 | Sato et al. ............... 713/200 |
| 2002/0095357 A1 | 7/2002 | Hunter et al. |
| 2002/0100043 A1 | 7/2002 | Lowthert et al. ............ 725/36 |
| 2002/0103699 A1 | 8/2002 | Figueiras Ferreiro |
| 2002/0112235 A1 | 8/2002 | Ballou et al. ............... 725/89 |
| 2002/0112243 A1 | 8/2002 | Hunter et al. ............ 725/133 |
| 2002/0120925 A1 | 8/2002 | Logan |
| 2002/0124251 A1 | 9/2002 | Hunter et al. ............... 725/42 |
| 2002/0184047 A1 | 12/2002 | Plotnick et al. |
| 2003/0004796 A1 | 1/2003 | Struble |
| 2003/0028888 A1 | 2/2003 | Hunter et al. ............... 725/55 |
| 2003/0036974 A1 * | 2/2003 | Allen ............... 705/27 |
| 2003/0061607 A1 | 3/2003 | Hunter et al. ............... 725/32 |
| 2003/0067554 A1 | 4/2003 | Klarfeld et al. |
| 2003/0133692 A1 | 7/2003 | Hunter ............... 386/35 |
| 2003/0149989 A1 | 8/2003 | Hunter et al. |
| 2004/0083492 A1 | 4/2004 | Goode et al. |
| 2004/0103439 A1 | 5/2004 | Macrae et al. ............... 725/109 |
| 2005/0010949 A1 | 1/2005 | Ward et al. ............... 725/42 |
| 2005/0097599 A1 | 5/2005 | Plotnick et al. ............ 725/32 |
| 2005/0182730 A1 | 8/2005 | Hunter et al. ............... 705/58 |
| 2006/0195548 A1 | 8/2006 | Hunter et al. ............... 709/217 |
| 2006/0212921 A1 | 9/2006 | Hunter et al. ............... 725/87 |
| 2006/0212908 A1 | 9/2006 | Hunter et al. ............... 725/86 |
| 2006/0229904 A1 | 10/2006 | Hunter et al. ............... 705/52 |
| 2006/0294016 A1 | 12/2006 | Hunter et al. ............... 705/51 |
| 2007/0028276 A1 | 2/2007 | Inoue et al. |
| 2007/0186272 A1 | 8/2007 | Hunter et al. ............... 725/87 |
| 2009/0099968 A1 | 4/2009 | Hunter et al. |

FOREIGN PATENT DOCUMENTS

| | | |
|---|---|---|
| EP | 0 756 423 A1 | 1/1997 |
| EP | 0 942 417 A2 | 3/1999 |
| EP | 0 954 176 A2 | 11/1999 |
| EP | 0 954 179 A2 | 11/1999 |
| EP | 0 975 111 A2 | 1/2000 |
| EP | 0 977 389 A2 | 2/2000 |
| EP | 0 984 631 A1 | 3/2000 |
| EP | 0 994 470 A2 | 4/2000 |
| EP | 1 252 732 B1 | 1/2001 |
| EP | 1 104 195 A2 | 5/2001 |
| EP | 1 143 721 A1 | 10/2001 |
| EP | 1 226 715 B1 | 4/2008 |
| JP | 360253082 | 12/1985 |
| JP | 40 7143081 A | 6/1995 |
| JP | 410290441 | 10/1998 |
| JP | 11 150517 A | 6/1999 |
| JP | 11 163811 A | 6/1999 |
| JP | 11 231077 A | 8/1999 |
| JP | 11 259764 A | 9/1999 |
| JP | 11 331150 A | 11/1999 |
| JP | 11 331839 A | 11/1999 |
| JP | 2002015333 | 1/2002 |
| JP | 2002099283 | 4/2002 |
| JP | 2002156979 | 5/2002 |
| TW | 503657 | 8/2000 |
| TW | 90101479 | 1/2001 |
| TW | 527835 | 3/2001 |
| WO | WO 91/03112 | 3/1991 |
| WO | WO 92/22983 | 12/1992 |
| WO | WO 94/13107 | 6/1994 |
| WO | WO 96/26605 | 8/1996 |
| WO | WO 96/34467 | 10/1996 |

| | | | |
|---|---|---|---|
| WO | WO 96/34494 | | 10/1996 |
| WO | WO 98/26357 | * | 6/1998 |
| WO | WO 98/27732 | | 6/1998 |
| WO | WO 99/18727 | | 4/1999 |
| WO | WO 9918518 A2 | * | 4/1999 |
| WO | WO 99/31842 | | 6/1999 |
| WO | WO 01/01677 | | 1/2000 |
| WO | WO 00/05886 | | 2/2000 |
| WO | WO 00/07368 | | 2/2000 |
| WO | WO 00/14965 | | 3/2000 |
| WO | WO 01/17242 | | 3/2001 |
| WO | WO 01/41013 | | 6/2001 |
| WO | WO 01/47249 | | 6/2001 |
| WO | WO 01/54324 | | 7/2001 |
| WO | WO 01/54410 | | 7/2001 |
| WO | WO 01/74050 | | 10/2001 |
| WO | WO 01/82625 | | 11/2001 |
| WO | WO 02/65750 | | 8/2002 |

OTHER PUBLICATIONS

"Wink Television Press Room," http://www.wink.com/contents/PressReleases.shtml, downloaded and printed on May 14, 2002.
"Wink Announces First National Advertising Partners: AT&T, Levi Strauss & Co., and GE," http://www.wink.com/contents/PressReleases/930708938/content.shtml, downloaded and printed on May 14, 2002, dated Sep. 9, 1998.
"Wink Communications, Inc., Changes the Advertising Landscape," http://www.wink.com/contents/PressReleases/930709807/content.shtml, downloaded and printed on May 14, 2002, dated Jan. 21, 1999.
"Wink's History," http://www.wink.com/contents/history.shtml, downloaded and printed on May 14, 2002.
"How Wink Works," http://www.wink.com/contents/howitworks.shtml, downloaded and printed on May 14, 2002.
"What is Wink: Examples," http://www.wink.com/contents/examples.shtml, downloaded and printed on May 14, 2002.
"The Wink System," http://www.wink.com/contents/tech_diagram.shtml, downloaded and printed on May 14, 2002.
"Wink Response Server and Wink Response Network," http://www.wink.com/contents/tech_wrs.shtml, downloaded and printed on May 14, 2002.
"ICAP and HTML (ATVEF)," http://www.wink.com/contents/tech_icap.shtml, downloaded and printed on May 14, 2002.
"Wink Studio and Wink Server Studio," http://www.wink.com/contents/tech_studio.shtml, downloaded and printed on May 14, 2002.
"Wink Broadcast Server," http://www.wink.com/contents/tech_wbs.shtml, downloaded and printed on May 14, 2002.
"Wink Client Software," http://www.wink.com/contents/tech_engine.shtml, downloaded and printed on May 14, 2002.
"DataPlay, Inc.—Universal Recording Media—Discover," http://www/dataplay.com/jsp_files/en/discover/index-music.jsp, downloaded and printed on May 14, 2002, (Copyright 2001).
"DataPlay, Inc.—Universal Recording Media—What's Playing on DataPlay," http://www/dataplay.com/servlets/ProductList?action=productSearch, downloaded and printed on May 14, 2002, (Copyright 2001).
"DataPlay, Inc.—Universal Recording Media—What's Playing on DataPlay," http://www/dataplay.com/jsp_files/en/whatsplaying/products.jsp, downloaded and printed on May 14, 2002, (Copyright 2001).
"DataPlay, Inc.—Universal Recording Media—What's Playing on DataPlay," http://www.dataplay.com/jsp_files/en/whatsplaying/products.jsp?action=details, downloaded and printed on May 14, 2002, (Copyright 2001).
"DataPlay, Inc.—Universal Recording Media—Industry," http://www.dataplay.com/jsp_files/en/industry/products-digitalmedia.jsp, downloaded and printed on May 14, 2002, (Copyright 2001).
"DataPlay, Inc.—Universal Recording Media—Industry," http://www.dataplay.com/jsp_files/en/industry/products-engines.jsp, downloaded and printed on May 14, 2002, (Copyright 2001).
"DataPlay, Inc.—Universal Recording Media—Industry," http://www.dataplay.com/jsp_files/en/industry.contentproviders.jsp, downloaded and printed on May 14, 2002,(Copyright 2001).
"DataPlay, Inc.—Universal Recording Media—Industry," http://www.dataplay.com/jsp_files/en/industry/products-contentkeyjsp, downloaded and printed on May 14, 2002, (Copyright 2001).
"DataPlay, Inc.—Universal Recording Media—Industry," http://www.dataplay.com/jsp_files/en/industry/index.jsp, downloaded and printed on May 14, 2002, (Copyright 2001).
"What's Playing on DataPlay—Everything Digital," DataPlay Micro-optical Engine Product Brochure, downloaded and printed on May 14, 2002, (Copyright 2000-2002).
"What's Playing on DataPlay—Everything Digital," DataPlay Digital Media Product Brochure, downloaded and printed on May 14, 2002, (Copyright 2000-2001).
"Onsale Invoice," http://www.onsale.com/cgi-win/invoice.exe, dated Jan. 19, 1998, printed Jan. 20, 1998, (Copyright 1997).
Onsale Packing Sheet (Jason Deep Space Series 225×60 Astronomy Telescope), received Jul. 1999.
Egghead Packing Receipt (Franklin Rex Organizer), received Dec. 1999.
"Sell Goods to Egghead.com," http://www.egghead.com/ShowPage.dll?page=hd_aboutus_sellgoods_p, printed Sep. 29, 2001.
"Demographics profile," http://www.egghead.com/ShowPage.dll?page=hd_aboutus_demo_p, printed Sep. 29, 2001.
"About us," http://www.egghead.com/ShowPage.dll?page=hd_aboutus_aboutus_p , printed Sep. 29, 2001.
"Privacy and Security Policy," http://www.egghead.com/ShowPage.dll?page=hd_policy_policyandprivacy_p, printed Sep. 29, 2001.
"Registration," http://www.egghead.com/ShowPage.dll?page=reg_page1_ceos&S=1, printed Sep. 26, 2001.
"New Credit Information," https://secure.fairmarket.com/secure/Cre...FM1001, printed Sep. 26, 2001.
"Quadrant 256MB, PC133 (PC-100 Compatible), 32×64, 7ns, 168-Pin, SdRAM DIMM Module (New)," wysiwyg://253/http://auctions.egghead.com...LotNo=65659811&BatchNo=0, printed Sep. 24, 2001.
"Ashton Digital VisionGate 52 15.1' TFT-LCD, Pivot Screen, USB Hub, w/ Speakers," wysiwyg://253/http://auctions.egghead.com...LotNo=66044439, printed Sep. 26, 2001.
"Login/Logout," http://www.egghead.com/ShowPage.dll?page...44439, printed Sep. 29, 2001.
"Enter Your Bid," wysiwyg://218/http://auctions.egghead.com...5a99, printed Sep. 29, 2001.
"Enter Your Bid," https://auctions.egghead.com/scripts/...LotNo=66044439, printed Sep. 29, 2001.
"Confirm Your Bid," wysiwyg://220/http://auctions.egghead.com...ShipCountry=US, printed Sep. 29, 2001.
"Bid Receipt for Bid No. 5270411," wysiwyg://220/http://auctions.egghead.com...KioskListing=0, printed Sep. 29, 2001.
"Universal Product Code(UPC) and EAN Article Numbering Code (EAN) Page," http://www.adams1.com/pub/russadam/upccode.html, by Russ Adams, printed Sep. 24, 2001.
"Internet Archive Way Back Machine— Searched for http://www.egghead.com," printed Apr. 8, 2002, (Copyright 2001).
"Internet Archive Way Back Machine—Searched for http://www.onsale.com," printed Apr. 8, 2002, (Copyright 2001).
"Calimetrics' Multilevel Technology Enables Higher-Performance CD/DVD Recorders: An IDC White Paper," Wolfgang Schlichting, (Copyright 2000).
"Making Digital Cinema Actually Happen—What it Takes and Who's Going to Do It," Steven A Morley, (Copyright 1998).
"Streaming Onto the Movie Screen, with Nary a Scratch," Karen J. Bannan, The New York Times, May 9, 2002, p. E5.
U.S. Appl. No. 09/385,671 Charles Eric Hunter (filed Aug. 27, 1999).
U.S. Appl. No. 09/436,281 Charles Eric Hunter (filed Nov. 8, 1999).
U.S. Appl. No. 09/476,078 Charles Eric Hunter (filed Dec. 30, 1999).
U.S. Appl. No. 09/487,978 Charles Eric Hunter et al. (filed Jan. 20, 2000).
U.S. Appl. No. 09/493,854 Charles Eric Hunter et al. (filed Jan. 28, 2000).
U.S. Appl. No. 09/502,069 Charles Eric Hunter et al. (filed Feb. 10, 2000).
U.S. Appl. No. 09/553,524 Charles Eric Hunter et al. (filed Apr. 20, 2000).

U.S. Appl. No. 09/645,087 Charles Eric Hunter et al. (filed Aug. 24, 2000).
U.S. Appl. No. 09/675,025 Charles Eric Hunter et al. (filed Sep. 28, 2000).
U.S. Appl. No. 09/684,442 Charles Eric Hunter et al. (filed Oct. 6, 2000).
U.S. Appl. No. 09/737,826 Charles Eric Hunter et al. (filed Dec. 15, 2000).
U.S. Appl. No. 09/855,992 Charles Eric Hunter et al. (filed May 15, 2001).
IBM Technical Disclosure Bulletin, "Multimedia Audio on Demand," 1994, 37, 1 page (Abstract only).
U.S. Appl. No. 11/085,944 Charles Eric Hunter et al. (filed Mar. 21, 2005).
U.S. Appl. No. 11/469,236 Charles Eric Hunter et al. (filed Aug. 31, 2006).
U.S. Appl. No. 11/801,109 Charles Eric Hunter et al. (filed May 7, 2007).
U.S. Appl. No. 11/468,959, filed Aug. 31, 2006, Hunter, et al.
U.S. Appl. No. 11/468,963, filed Aug. 31, 2006, Hunter, et al.
U.S. Appl. No. 11/468,969, filed Aug. 31, 2006, Hunter, et al.
U.S. Appl. No. 11/469,130, filed Aug. 31, 2006, Hunter, et al.
U.S. Appl. No. 11/469,292, filed Aug. 31, 2006, Hunter, et al.
U.S. Appl. No. 11/469,319, filed Aug. 31, 2006, Hunter, et al.
U.S. Appl. No. 60/169,274, filed Dec. 7, 1999, Moskowitz.
About.com, "Circuit City's DIVX Format Bites the Dust!", www.hometheater.about.com, published Jun. 21, 1996, 3 pages.
Adams, "Universal Product Code (UPC) and EAN Article Numbering Code (EAN) Page," http://www.adamsl.com/pub/russadam/upc-code.html, printed Sep. 24, 2001, 7 pages.
Communication by the Examining Division dated Jul. 29, 2005, in corresponding EP application No. 009594300.
Communication by the Examining Division dated Mar. 22, 2004, in corresponding EP application No. 019031848.
Communication: Supplementary EP Search Report dated Apr. 19, 2005, in corresponding EP application No. 009594300.
Connell, "Conference on Lasers and Electro-Optics:Perspectives on Printing, Storage and Display," 1996 Tech Digest Series, vol. 9, Jun. 2-7, 1996, 6 pages.
DVD Forum, "Supplementary Documents Issued in the Past for DVD-Video Boork Part 3: Video Specifications," Version 1.11, Toshiba Corporation, May 1999, 1 page.
ISO/IEC, "Information technology—Generic coding of moving pictures and associated audio information: Systems." International Organization for Standardization (ISO) and International Electrotechnical Commission (IEC) 13818-1, First edition, Apr. 15, 1996, p. 1-6.
PCT International Preliminary Examination Report received Aug. 3, 2001, in corresponding International Application No. PCT/US00/23410.
PCT International Preliminary Examination Report received Feb. 4, 2002, in corresponding International Application No. PCT/US01/01979.
PCT International Preliminary Examination Report received Jun. 3, 2002, in corresponding International Application No. PCT/US01/05675.
PCT International Search Report mailed Aug. 28, 2001, in corresponding International Application No. PCT/US01/05675.
PCT International Search Report mailed May 17, 2001, in corresponding International Application No. PCT/US01/01979.
PCT International Search Report mailed Nov. 28, 2000, in corresponding International Application No. PCT/US00/23410.
Sennaroglu, et al., "Generation of Tunable Femtosecond Pulses in the 1.21-1.27 um and 605-635 nm Wavelength Region by Using a regenertively Initiated Self-Mode-Locked Cr: Forsterite Laser," IEEE, Aug. 1994, 11 pages.
Tsuchiya, et al., "High Density Digital Videodics Using 635 nm Laser Diode," IEEE, Aug. 1994, 6 pages.
US 5,825,354, 10/1998, Ahmad et al. (withdrawn)

* cited by examiner

| STEP | MODE NAME: | DESCRIPTION | HARDWARE INVOLVED |
|---|---|---|---|
| 1 | SELECTION | CUSTOMER LOOKS AT RECENTLY UPDATED "CATALOG" OF AVAILABLE MUSIC SELECTIONS ON HIS TV USING THE GRAPHICAL USER INTERFACE. USE REMOTE TO PAGE THROUGH INFORMATION. | USER STATION, REMOTE, CUSTOMER TV, STORED CATALOG |
| 2 | ORDERING | CUSTOMER USES USER STATION, REMOTE AND TV SCREEN TO ORDER STANDARD OR CUSTOMIZED CD. ORDER COMMUNICATED TO CENTRAL CONTROLLER BY INTERNET OR MODEM. CENTRAL CONTROLLER ISSUES DECODING AND ENCRYPTION KEY(S), SELECTION LOCATIONS AND ORDER NUMBER TO USER STATION FOR PREVIEW. | USER STATION, MODEM/INTERNET, REMOTE, CUSTOMER TV |
| 3 | DOWNLOADING | MUSIC SELECTIONS ARE DOWNLOADED DURING EARLY MORNING TRANSMISSION HOURS AS ENCRYPTED, COMPRESSED FILES THROUGH CUSTOMER'S SATELLITE DISH AND RECEIVER TO HARD DISK IN USER STATION. USER STATION SELECTS CORRECT TV CHANNEL ON RECEIVER USING IR LINK. | USER STATION, SATELLITE RECEIVER, VIDEO OUTPUT INTERFACE |
| 4 | DECODING | USER STATION USES DECODING KEY(S) TO DECODE DOWNLOADED FILE(S) SO THAT FULL QUALITY MUSIC IS ON DISK DRIVE (OR OTHER STORAGE MEDIUM) IN USER STATION. CUSTOMER ORDER NUMBER IS HIDDEN WITHIN THIS MUSIC BASED UPON ENCRYPTION INFORMATION RECEIVED DURING ORDERING PROCESS. | USER STATION |
| 5 | PREVIEWING | BRIEF PORTIONS OF DOWNLOADED SELECTIONS MAY BE "PREVIEWED" BY THE CUSTOMER ALONG WITH THE ENTIRE SELECTION THAT HAS BEEN "HOBBLED" BY REMOVING INFORMATION TO DEGRADE MUSIC QUALITY AND PREVENT RECONSTRUCTION OF MUSIC. | USER STATION, REMOTE, CUSTOMER'S AMP, SPEAKERS AND TV |
| 6 | PLAYING | CUSTOMER PLAYS FULL-QUALITY SELECTION THROUGH HIS HI-FI OR TV SOUND SYSTEM WITH POST BILLING BACK HIS ACCOUNT VIA LATER MODEM/INTERNET COMMUNICATION WITH THE CENTRAL CONTROLLER. PLAYING MAY INCLUDE GRAPHICS, WRITTEN JACKET IN-FORMATION, OR HEARING IMPAIRED CUES SHOWN ON CUSTOMER'S TV. | USER STATION, REMOTE, CUSTOMER'S AMP, SPEAKERS AND TV |
| 7 | CD DELIVERY | FULL-QUALITY CD THAT CAN BE HEARD ON ANY CD PLAYER IS BURNED WITH ORDER NUMBER (ID TAG) HIDDEN IN THE MUSIC. (BURNING PROCESS DOES NOT NEED TO BE QUICK.) | USER STATION, CD BURNER, CUSTOMER SUPPLIED CD |
|  | ACCOUNT SETUP | HAPPENS WHEN CUSTOMER BUYS AND HOOKS UP THE USER STATION. |  |

*FIG. 2*

SELECT MUSIC STYLE PREFERENCES

- ALTERNATIVE
- BLUES
- BOOKS & SPOKEN
- CHILDREN'S MUSIC
- CHRISTIAN & GOSPEL
- CLASSICAL
- COUNTRY

- COMEDY
- DANCE & DJ
- EASY LISTENING
- ELECTRONIC
- FOLK
- HIP HOP/RAP
- INTERNATIONAL

- JAZZ
- LATIN
- METAL
- NEW AGE
- OPERA & VOCAL
- POP & ROCK
- R&B/SOUL

*FIG. 9*

| | CUSTOMERS W/O CD BURNER | CUSTOMERS WITH CD BURNER |
|---|---|---|
| STEAMING DURING THE DAY (TOP RELEASES FROM DOWNLOAD CATALOG) | | ✓ |
| BATCH STREAM AT NIGHT (ALL ORDERED RELEASES FROM DOWNLOAD CATALOG) | | ✓ |
| PROFILE BASED STREAM AT NIGHT (RELEASES FROM FULL LIBRARY "QUICK-SHIP" CATALOG) | | ✓ |
| PROMOTION BASED STREAM (PROMOTIONAL MUSIC PUSHED BY RECORD LABEL) | | ✓ |
| QUICK-SHIP OVERNIGHT (FULL LIBRARY CATALOG) | ✓ | ✓ |

FIG. 15

METHOD AND SYSTEM FOR MUSIC DISTRIBUTION

CROSS REFERENCE TO RELATED APPLICATIONS

This application is a continuation in part of Ser. No. 09/385,671, filed Aug. 27, 1999 now abandoned; Ser. No. 09/436,281, filed Nov. 8, 1999 now abandoned; Ser. No. 09/476,078, filed Dec. 30, 1999 now abandoned; Ser. No. 09/487,978, filed Jan. 20, 2000 now U.S. Pat. No. 6,952,685; Ser. No. 09/493,854, filed Jan. 28, 2000 now abandoned; Ser. No. 09/502,069, filed Feb. 10, 2000 U.S. Pat. No. 6,647,417; and Ser. No. 09/684,442, filed Oct. 6, 2000 U.S. Pat. No. 7,370,016, the contents of which are incorporated herein by reference in their entirety.

FIELD OF THE INVENTION

The invention relates to music distribution. In certain embodiments, music is blanket transmitted (for example, via satellite downlink transmission) to each customer's user station (set top box) where selected music files are recorded. Customers preselect from a list of available music in advance using an interactive screen selector, and pay only for recorded music that they choose to playback for their enjoyment. An antipiracy "ID tag" is woven into the recorded music so that any illegal copies therefrom may be traced to the purchase transaction.

DESCRIPTION OF THE PRIOR ART

Current music distribution systems have numerous drawbacks that affect pricing, consumer satisfaction and the ability of music content providers to maximize the revenue potential of their music libraries. One distribution model, the conventional retail music store, requires high capital outlays for real estate (land and building) and high labor costs, both of which add greatly to the retail price of music recordings. Additionally, costs associated with ordering the recordings (e.g., CD's), transporting the recordings to the store locations and maintaining inventory significantly add to the retail price of recordings for both retail store operations and mail order or "music club" operations. In addition to the drawbacks mentioned above, music content providers would greatly benefit from a distribution system that makes all of their content, including older recordings, readily available at market clearing pricing.

The recent Internet music distribution model, typically based on MP3 technology, requires a customer go to an Internet site, select or be given a music selection, download reception software and a key, preview or purchase a selection, download a one-to-one encrypted (or not) compressed copy of the selection, decrypt the selection with software and play the selection on the consumer's computer or write it to a CD, DVD, MD or digital player. The download is stored in some form on the customer's hard drive.

There is an acute need in the music distribution industry for a system that will overcome problems inherent in current distribution models by providing each individual customer with ready access to thousands of recordings in a convenient low cost manner that fully satisfies user demand, while enhancing the economic incentives of music content providers to create and distribute an ever expanding offering of music.

Throughout the world today, piracy of software, music and video materials causes significant economic losses to the originators and distributors of these art forms.

Issues of music and video piracy are strongly influenced by the available recording technology. Early forms of music distribution utilized plastic records. The manufacture of records was relatively expensive, requiring the capital expense of record presses and creating metallic master molds. Mold costs had to be amortized over large numbers of copies. The cost of mold masters limited the potential profit from making and selling illegal copies.

With the development of magnetic tape recording, the cost of manufacturing copies became primarily the cost of the raw materials. Copies could be made directly from an original with costs split between the manufacture of a blank tape and the time required to record music on to each tape copy. The manufacture of lower numbers of copies for specialty music was possible and the costs of manufacturing (a pair of tape recorders and some blank tapes) made copying feasible for an individual. However, the degradation in quality from generation to generation of copies was a deterrent as well as the time required to record each copy. The degradation of the sound consisted of loss of high frequencies, a relatively poor signal-to-noise ratio of the recording ("hiss") and tonal or volume variations due to mechanical transport of the tape across the recording head ("wow" and "flutter").

Digital compact disk technology (CD's) again changed the piracy situation by making available high-quality copies of music to consumers in digital form that could potentially be copied with no change or degradation of sound quality. CD's use 16-bit, 44 KHz digital technology so that music recorded on a CD has excellent signal-to-noise ratio, flat frequency response that is wider than human hearing, and no constant or varying pitch distortion. The introduction of CD technology caused significant concern among content providers about the risks of circulating library-quality copies of their music. Small-scale piracy of CD's became common as consumer music "boxes" were sold that had CD players feeding tape recorders. These units allowed CD's to be easily copied although without the full sound quality and convenience of the original CD. On a larger scale, bulk pirate copies of CD's were available, particularly in foreign countries, by companies using relatively expensive CD presses. The presses allowed exact copies of CD's to be made from originals using inexpensive blanks. These same presses also allowed low-cost copying and duplication of software CD's.

Very recently, concerns about music piracy have increased as low-cost CD writers became available to consumers making it possible for personal computers not only to read and play music CD's, but also to make copies using relatively inexpensive writeable CD's. Today CD writers are available for under $200 and CD blanks for less than $1 each. Coupled with multi giga-byte hard disks, copying and editing CD's is widely available.

Today, the threat of copyright violation limits CD piracy. However, due to the cost of prosecution and the difficulty of tracing and confirming the origin of copies, this threat is only practically enforceable against major producers who are caught importing large quantities of CD's, and not individuals or small-scale pirates (e.g., teenagers with computers). As the price of CD burners and writeable CD's continues to fall, music piracy may result in increasing losses in revenue to content providers, especially if the teenage culture (that buys so many CD's) embraces piracy and kids get used to seeing CD's without boxes or colorful paintings on the CD's.

A second technological revolution is also influencing piracy. This is the ability to "compress" the amount of digital data needed to store or communicate music (or video). A one-hour music CD requires about 600 megabytes of data (16 bits/sample*44100 samples/sec*3600 sec*2 channels). This large amount of data has discouraged communication of CD's over the Internet, and storage of the CD in hard drives. However, MPEG compression technology reduces the data capacity by a factor of 8 for CD music, making it easier and cheaper to communicate and store. As a result of compression technology it is now economically feasible to communicate music with CD quality over the Internet or to transmit it directly to consumer receivers from satellites. (Similar technology allows a 100-fold compression of video signals making direct-satellite TV and DVD recordings possible.) Furthermore, businesses that sell CD's by shipping them as compressed data streams to a customer's PC with a CD writer to make a final copy will make it common for CD's not to have the elaborate paint jobs of store-sold CD's and the potential to cause a sudden rise in piracy. It also should also be noted that compression depends upon and has caused powerful digital processing engines to be placed at reception sites for compressed audio or video. These engines make possible the running of protected software (protected software is software that runs the engine but can not be analyzed by outsiders to see how it works or does the encoding or decoding) that can be used for de-encryption or be capable of performing the processing necessary to add the more complex ID tags that can be used as an aspect of this invention.

Content providers are reluctant to make full-quality music available to consumers via direct satellite broadcasting or the Internet because of the risk that exact copies of their materials, their core asset, will leave their control and freely circulate among consumers resulting in huge losses in revenue to distributors and artists. This financial threat could weaken the recording and entertainment industry in the United States.

Another set of issues concerns the evolution of targeted advertising. Targeting is the presentation of material to preselected groups. For example, a new record thought to appeal to teenagers would be described by advertising in magazines teenagers read, TV shows they may watch or on radio stations they are likely to listen to. Because of the wide range of music types and preferences, targeted advertising is key to affordable, efficient advertising in the music industry. Similarly, the trend for CD stores to allow potential customers to sample music releases is a method of allowing very specific sampling of possible choices of targeted advertising recognizing that customers rarely purchase without prior knowledge of the group, recommendations, advertisement, or hearing part of the music.

SUMMARY OF THE INVENTION

The present invention provides music distribution systems that are beneficial to all involved parties, namely consumers, content providers and data transmission providers. In certain embodiments, consumers are able to preselect music selections from thousands of CD's that are transmitted daily. Customers of the music distribution system utilize a menu driven, graphical user interface with simplified controls that provide music selection by artist, title and category (e.g., jazz, classical, rock, etc.). Music content is blanket transmitted, preferably via direct broadcast satellite (DBS), in an encoded format directly to each customer's receiving dish or antenna which is linked to the customer's user station (set top box). In certain embodiments, the user station may store the content on a suitable intermediate storage medium such as a disk drive. The customer may "preview" the stored music for free and thereafter decide whether to purchase a permanent copy. If the purchase decision is made, a full quality CD is recorded via a CD writer that may be part of the user station. The customer is billed by the music distribution system operator. Antipiracy protection is provided by weaving an ID tag into the recorded music so that any illegal copies therefrom may be traced to the purchase transaction. An automated production facility may be provided to manufacture low-volume CD's (i.e., CD's that are not frequently requested) and distribute them by ground transportation, while the higher volume CD's are distributed by satellite as described above.

In other embodiments, the music that is selected for recording at a particular customer's user station is recorded in encrypted format on a relatively large, dedicated portion of the user station's hard disk drive from which it is directly accessed by the customer for listening. This embodiment serves as a "digital jukebox" that overcomes certain piracy considerations associated with recording the music onto conventional media such as CD's and DVD's.

Customer music preferences may be used to determine what content is stored in the limited space on their hard drive, and that content is immediately available, on demand, to the consumer. Customer preference information is thereby used to make use of limited broadcast bandwidth and system storage. This preference information is gleaned from information given by the user, and may be combined with demographic preference information collected from a population of customers.

The music distribution system of the present invention offers numerous advantages to consumers. For example, the invention provides a much greater selection of recordings than any typical retail music store or mail order operation. The invention also provides full access to the available recordings to those who live in geographically remote and/or sparsely populated areas that may presently have little or no access to retail music stores. The invention also provides full access to recordings to elderly and handicapped persons who are housebound. In addition to a larger selection and better access, the recordings (especially high demand recordings such as "top 25" CD's and new releases) are available on demand, subject only to the time period between placing an order and the next transmission of the ordered recording. Certain recordings, limited in number by the capacity of the intermediate storage medium (e.g., 80 CD's) are instantly available for purchase.

The present invention also provides the ability to update music pricing at any time, for example on a daily, weekly or monthly basis, so that consumers can choose to order music at times when content providers offer pricing specials or incentives.

Music content providers realize increased income increased income because a significant portion of the existing content in their music libraries is available for sale every day. The invention also allows music content providers to change pricing at any time, e.g., daily/weekly/monthly, to optimize price vs. consumer demand. In this regard, content providers are allowed to meet consumer demand for a significant portion of the existing content inventory value every day. This provides an extremely high benefit by effectively allowing the market to clear (i.e., real demand matches supply), something that the current music distribution models do not provide.

According to the invention, music content providers are confident that they can distribute their music with extremely high security by avoiding distribution of content over open networks and open operating systems and through the use of appropriate encoding technology, including encryption/decryption and the use of ID tags that permit illegal copies to be traced.

Transmission providers (DBS satellite system providers, in preferred embodiments) realize the advantage of a significantly increased income base for supporting their services and the utilization of lower cost, off-peak time for transmission of a significant portion of the music.

This system also allows targeted advertising of specific recordings to persons of specific preferences. This advertising may be text, graphics or video on the customer's screen or portions of music.

BRIEF DESCRIPTION OF THE DRAWINGS

Some of the features of the invention having been stated, other features will appear as the description proceeds, when taken in connection with the accompanying drawings, in which—

FIG. 2 shows the operational sequence for use of the music distribution system of FIG. 1 by a customer.

FIG. 9 shows a screen containing one example of a simple graphical user interface used by a customer to enter customer music preference information by music style.

FIG. 15 is a chart identifying various music distribution methods employed according to certain embodiments of the invention and the options available to customers with and without recording devices (e.g., CD burners).

DETAILED DESCRIPTION OF THE INVENTION

While the present invention will be described more fully hereinafter with reference to the accompanying drawings, in which aspects of the preferred manner of practicing the present invention are shown, it is to be understood at the outset of the description which follows that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention.

1. The Overall Music Distribution System, Generally

Figure 1:
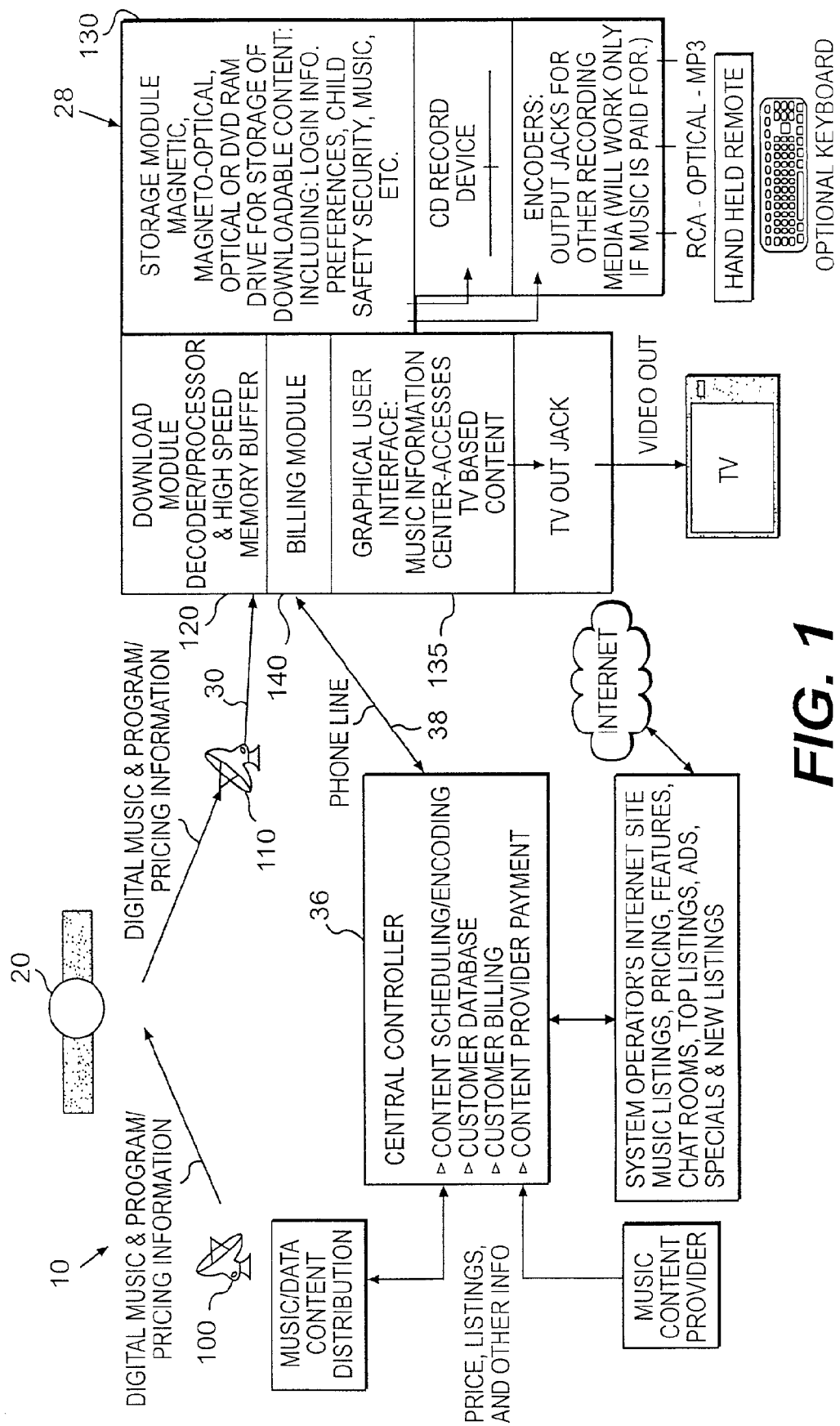
FIG. 1 is a schematic representation of a satellite-based music distribution system.

Referring to FIG. 1, there is shown a simple schematic of one embodiment of a music distribution system 10 of the invention. System 10 utilizes direct broadcast satellite (DBS) transmission via satellite 20 as the means for blanket transmitting encoded data, either in real time or in time compressed format (for example, at two to four seconds per song). The program data is received at each customer household by a receiving antenna or dish 110. Dish 110 is linked to a dedicated "box" or user station 28 by a satellite receiver link 30. User station 28 is an interactive device permitting customers to preselect desired music selections for recording through the user station. Station 28 communicates at appropriate times with a central controller system 36 via a phone/modem connection 38 (land, Internet or cellular). Central controller system 36 stores a discrete address (e.g., telephone number, credit card number or billing address) for each customer household and receives information via connection 38 to verify that a preselected music selection has been recorded. Central controller system 36 utilizes this information to bill customer households and also to credit the accounts of content providers. The satellite link (or alternatively the central controller system 36) periodically communicates with each customer household to provide information on available music and program/pricing information.

Further details of the distribution system are provided below and in commonly owned U.S. patent application Ser. Nos. 09/385,671; 09/436,281; 09/476,078 and 09/493,854, the teachings of which are incorporated herein by reference in their entirety.

2. The Satellite(s)

According to preferred embodiments of the present invention, data transmission is achieved utilizing geostationary satellites operating in the KU band that are downlinked to conventional receiving antennae or dishes located at the customer households.

Following the recent acquisition of PrimeStar's assets by Hughes, there are now two digital broadcast satellite providers in the United States, Hughes (DSS) and EchoStar (DISH Network). EchoStar's DISH network launched an additional satellite in September 1999 (its fifth satellite) that, in combination with its previous satellites, provides continuous transmission of greater than five hundred channels to substantially the entire continental United States. EchoStar now has satellites located in the 119, 110, 61.5 and 148 positions within the Clark Belt.

With the above satellite orientations, EchoStar's new "DISH 500" system utilizes an elliptical twenty inch antenna or dish containing two LMBS heads that can receive information from two different satellites simultaneously. As mentioned above, this system permits greater than five hundred channels to be directly broadcast to each customer household.

Currently preferred embodiments of the present invention utilize the EchoStar system, most preferably the DISH 500 system, for data transmission at either real time or time-compressed transmission rates, discussed below. In alternative embodiments, the invention may be implemented utilizing the Hughes (DSS) system, or a combination of both the Hughes and EchoStar systems (resulting in a relatively smaller portion of each system's total capacity being devoted to the invention's music distribution).

3. Data Transmission Parameters

EchoStar's DISH 500 system provides a very high band width of approximately 4 megabits/sec for each channel (23 megabits/sec per transponder), for a total transmission capacity of approximately 2000 megabits/sec for five hundred channels.

It will be appreciated that instead of using more typical 120 watt DBS transponders, implementation of the present invention may be carried out with higher power transponders (e.g., 240 watt transponders) to increase the effective transponder capacity (e.g., from 23 megabits/sec to 30 megabits/sec) by reducing much of the capacity allotted for forward error correction and system management inherent in lower power transponders. Also, along with the use of higher power transponders, the invention may be carried out with quanternary (QPSK) polarization to double the effective bit transfer rate for each transponder over that which may be obtained by using current orthogonal polarization—with a sacrifice in bit error rate that is acceptable for those applications of the invention where lower video and audio resolution is not an important consideration to the customer. Thus, the use of high power transponders (e.g., 240 watts or higher) in conjunction with higher level polarization (e.g., quanternary) permits music distribution systems of the invention to be implemented utilizing less of the DBS system's total transmission capacity, permits the transmission of a greater number of music selections or other content and permits greater time compression of the transmitted data, or a combination of the above, all to the benefit of consumers.

4. Details of the User Station and Operation

Referring again to FIG. 1, music content providers deliver music in digital form to the central controller 36 of the music distribution system. The content is encoded utilizing an encoding technology that is well known in the art, such as interlaced coding techniques in combination with a unique header code that identifies each title. In certain embodiments, only the unique header coding is employed to identify each specific title. It is also understood that the header code can also identify the exact transmission time of each title. The header code containing transmission times can be digitally communicated to the operating system of the user stations 28 to prevent unauthorized reception and subsequent duplication of digital music content. In addition, it is also understood that selection of a specific title by the user can require a completed payment before activation of initial reception and storage of the digital music content, or before the digital music content is recorded on any other device or media.

The encoded music content is scheduled and transmitted to the direct broadcast satellite up-link facility 100 by the system operator through central controller 36. In addition, periodic digital program/pricing information is transmitted to the up-link facility, for example, every ten minutes. While it is understood that direct broadcast satellite transmission currently operates in the KU Band, other frequencies can also be employed to achieve similar results. It is understood that the music content can be transmitted at real or time compressed speeds. In preferred embodiments, music content is transmitted at faster than real time speeds, where real time speeds refer to the playback speed of the recorded music. For example, a single satellite transponder capable of 23 megabits/sec transmission can transmit a typical 4 minute song in less than 4 seconds, for example, in certain applications approximately 2 seconds per song utilizing high compression techniques. Thus, EchoStar's DBS programming capacity (discussed above) allows transmission of 400,000 to 500,000 song titles (approximately 30,000 to 40,000 CD's) during a four hour period (assuming 4 seconds per song), most preferably during a period of low viewership, e.g., 1:00 AM to 5:00 AM. Using a single transponder for blanket music transmission permits transmission of 500 to 600 CD's in a four hour period.

The digital music content and program/pricing information, once received by the appropriate satellite, are then transmitted down broadly (i.e., "blanket transmitted") to geographic coverage areas where the user stations can receive the downlink transmissions.

The music program and pricing information are received by the home user's satellite dish 110 and transmitted to download module 120 contained in the user station where it is decoded and stored digitally in storage module 130 also contained in the user station.

The customer preselects music content to be downloaded by selecting the content utilizing the graphical user interface 135 shown on the TV screen. The order is communicated to central controller 36 by Internet or modem. Pricing information for the preselected music content is then transmitted to the billing module 140 contained in the user station where it is stored in nonvolatile memory such as SRAM for subsequent querying via the phone line by central controller 36.

The music content preselected by the customer is blanket transmitted by satellite 20 at the scheduled time and is received by the home user's satellite dish 110. This music content is transmitted to download module 120 where it is decoded and stored digitally in storage module 130.

In certain embodiments, the user station 28 will also contain an audio speaker system (not shown) to allow the customer to "preview" the stored music before it is recorded permanently on a CD or other recordable medium and subsequently paid for. In this embodiment, the preselected pricing information stored in billing module 140 will not be transmitted for payment to the system operator until the customer has either listened to the music content a set number of times, for example, 3 times, or the customer indicates via the graphical user interface that he wishes to permanently record it. As an alternative, previewing may be accomplished by playing a highly compressed "preview" copy through the customer's speaker system or headphones. Highly compressed material lacks richness, signal to noise ratio, stereo channels and high-frequency bandwidth. Preview can be communicated in perhaps 1% to 10% of the final copy depending upon the compression schemes used. Each preview has a brief section (20 seconds) of the real sound of the selection to allow the customer to really sample the material as well as generate interest in paying for a "good copy". If desired, the preview material may be further hobbled with some simple distortion, added noise, limited low end, crackles and pops, voice overlay, missing sections, sliding notches, amplitude compression. Content providers may be given choice as to the nature of the hobbling beyond the heavy transmission compression.

When the customer decides to purchase the music, the graphical user interface prompts the customer to insert a recordable medium such as a writeable CD into the user station, or attach other recording device to the user station's output connectors. (In certain cases, the customer may choose to record preselected music content multiple times. In such cases the music content provider may offer pricing discounts for multiple recordings.) The user station records the preselected music content stored in the user station and then either deletes the music contained in storage module 130 once the recording has been completed or allows the customer to manually delete content no longer desired.

The customer accesses (or navigates) the graphical user interface via a hand held remote. In preferred embodiments, the remote control communicates via infrared LED transmitter to an infrared sensor contained on the user station. An optional keyboard can be utilized by the customer to access (or navigate) the graphical user interface via the same infrared sensor contained on the user station.

The above sequence of operation is summarized in FIG. 2, which is largely self explanatory. The illustrated modes of operation, following account setup, are identified as:

1. Selection
2. Ordering
3. Downloading
4. Decoding
5. Previewing
6. Playing
7. CD Delivery.

Figure 3:
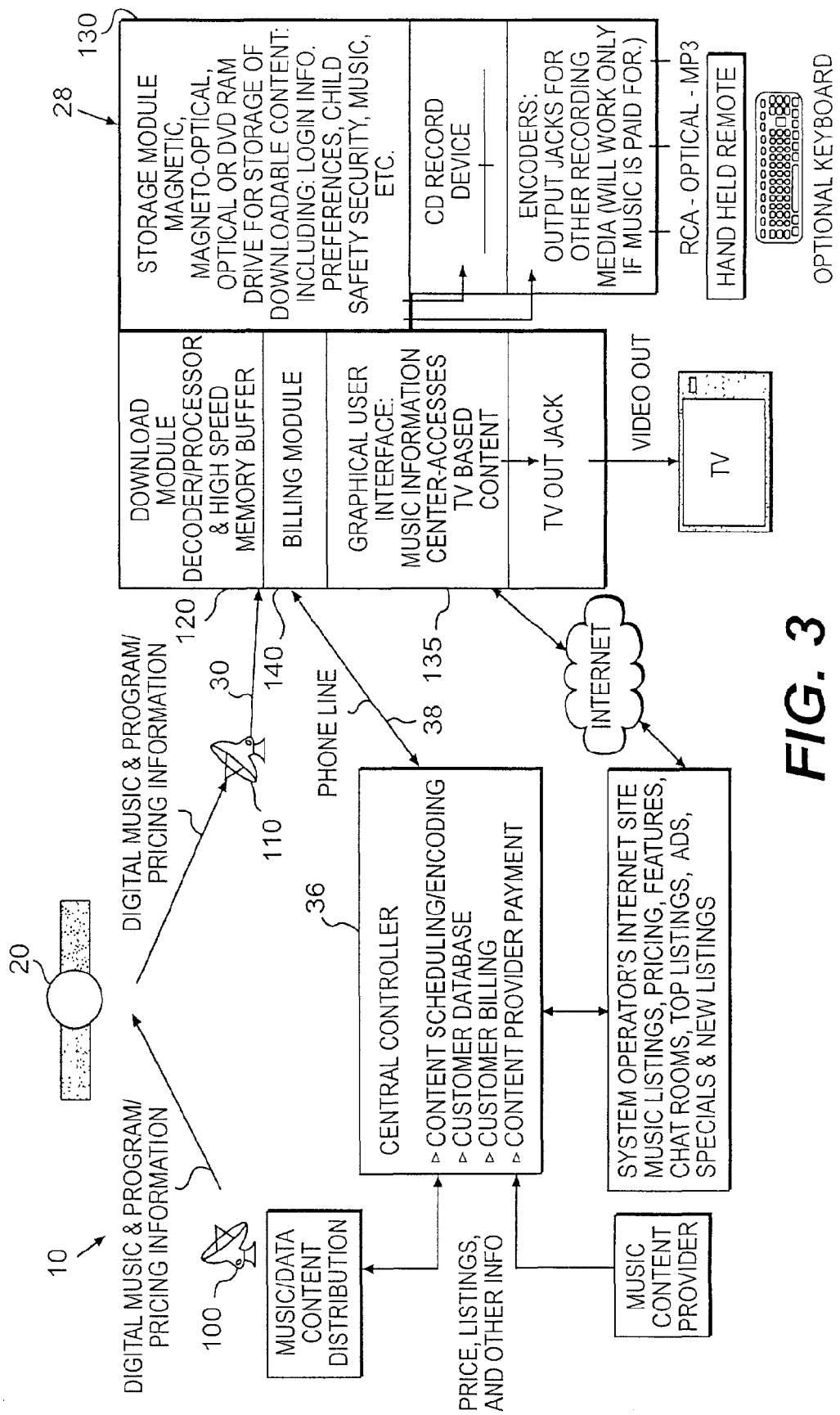
FIG. 3 shows another music distribution system wherein the user station includes an Internet browser and processor enabling customers to access the system operator's music Internet site via phone line or Internet connection.

FIG. 3 illustrates another embodiment wherein the user station contains an Internet browser and processor that enables the customer to access the system operator's music Internet site via phone line or other Internet connection.

Figure 4:
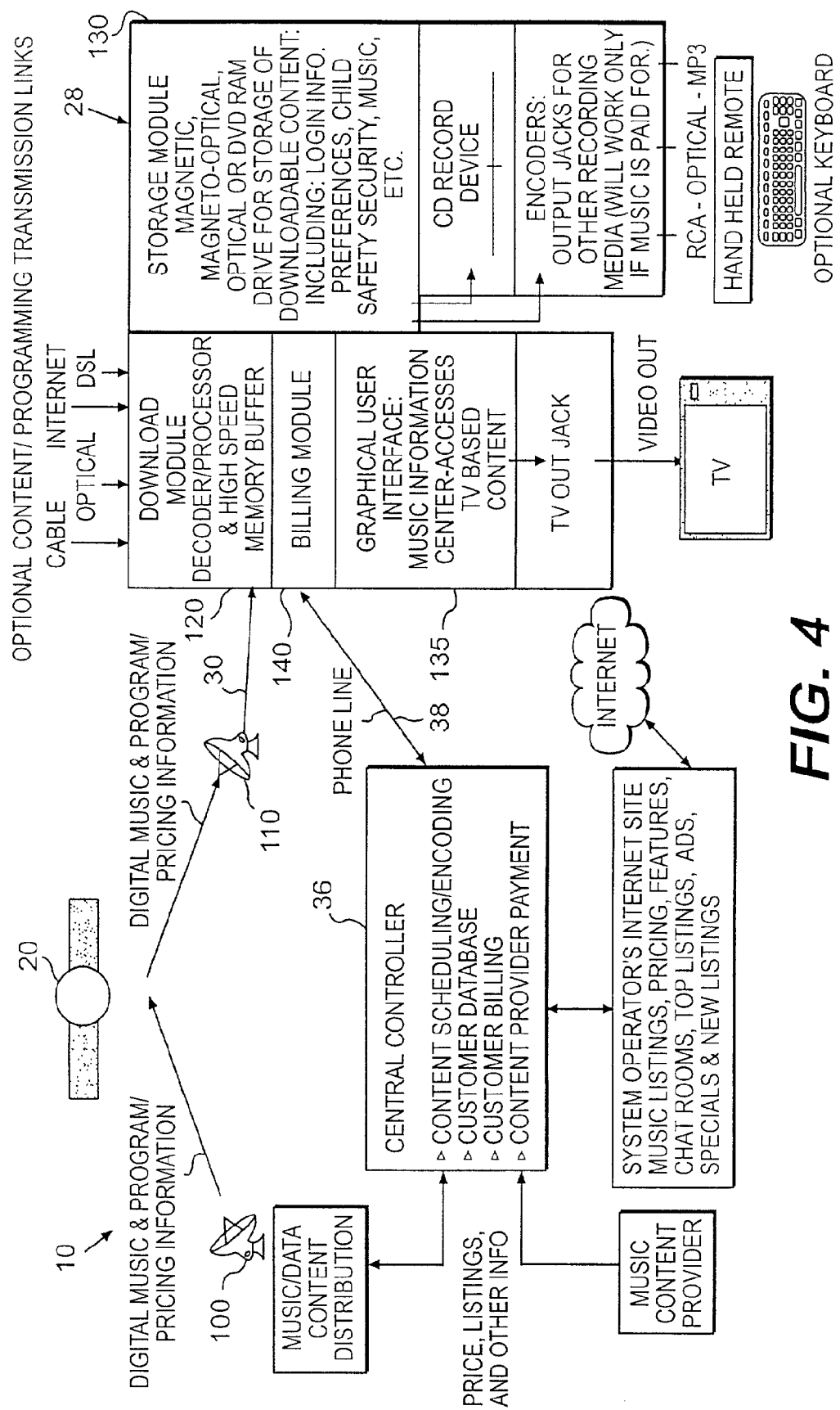
FIG. 4 shows yet another music distribution system depicting optional content/programming transmission links.

Optional digital content/programming transmission links (i.e., optional means for blanket transmitting music and =other data) are shown in FIG. 4. These include, but are not limited to, cable, optical fiber, DSL and the Internet.

5. Alternative Technologies for Scheduling Transmission of Music

Figure 6:
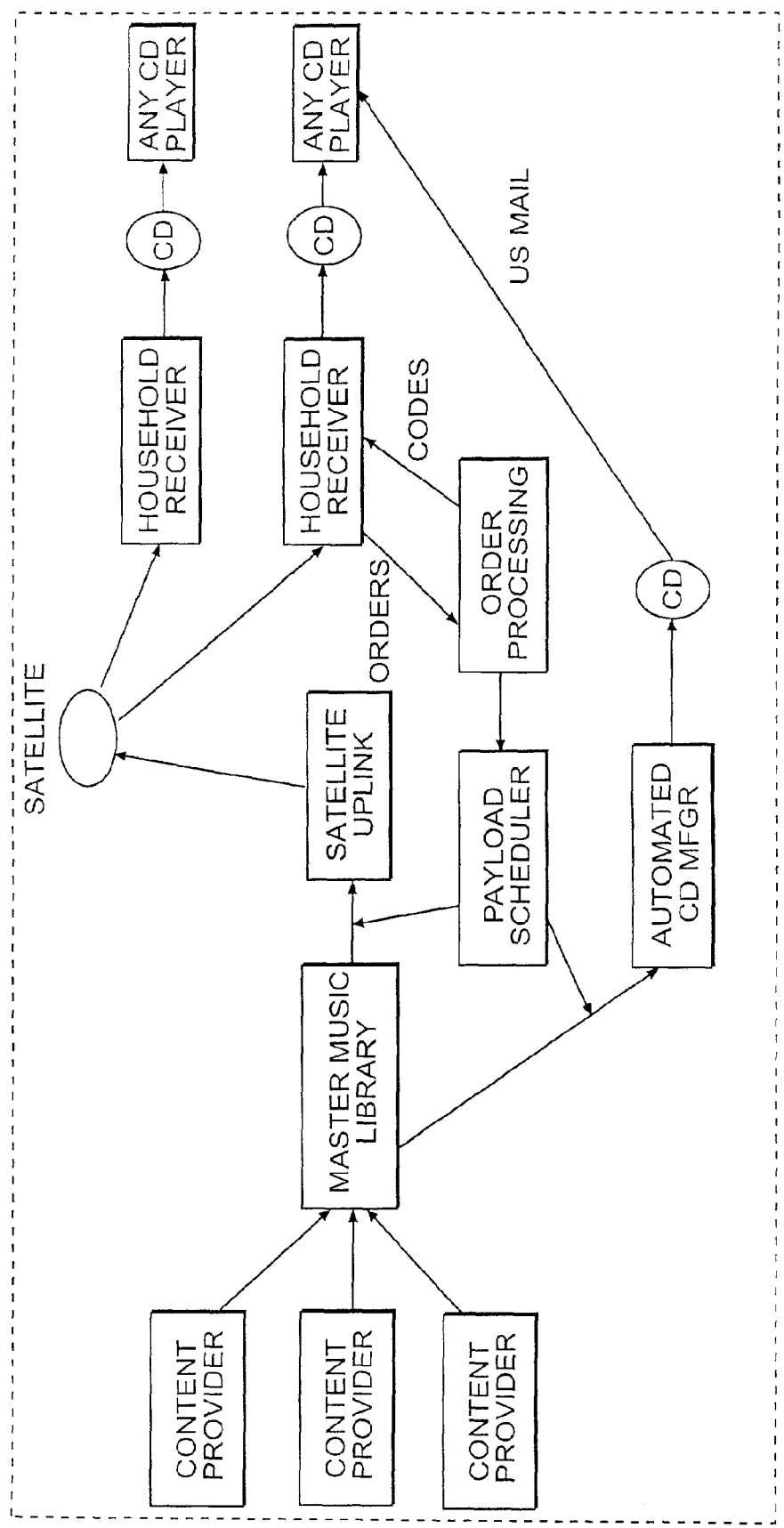
FIG. 6 is a block diagram of portions of a music distribution system showing an automated CD manufacturing operation used to supplement satellite distribution, and also showing a "payload scheduler" used to actively manage the transmission schedule of music.

Certain embodiments of the invention divide music into "tiers" of transmission frequency. For example, the music may be divided into three tiers, with Tier 1 music (the most popular) being transmitted every 30 minutes, Tier 2 music every four hours and Tier 3 music (the least requested) being sent late night. This assignment of music to appropriate tiers occurs on a daily or weekly basis. Other embodiments simply transmit all music once a day, for example during late night, off-peak hours. However, due to bandwidth limits and the significant costs of existing satellite transmission systems, it may be desirable to actively manage the transmission schedules of music to maximize consumer satisfaction (see FIG. 6).

Active scheduling of music on an hourly basis allows maximizing consumer satisfaction by monitoring music requests from all or a subset of satellite receivers and appropriately scheduling transmissions of the music. This might mean having a fixed schedule for 90% of the next few hours of transmissions, but allocating the last 10% of bandwidth (or purchasing extra bandwidth) to send music that happens to be more popular that day. More popular music might happen due to quickly changing popularity demographics perhaps due to a news story, Internet review or cultural happenstance. The effect may be to move a selection to the maximum rate of transmission (e.g., every 15 minutes) or move a Tier 3 selection from an overnight transmission to an hourly transmission. Similarly, a Tier 1 selection that is poorly requested might be replaced.

There are many possible schemes for assigning transmission slots varying from the "hottest 10%" scheme above to methods that assign slots based upon the estimated ordering demographics. For instance, if college students are determined to place a high value on quick delivery of their selection whereas the "older adult" market is as satisfied with one-hour or two-hour delivery, then requests coming from the college market may get priority assignment of transmissions. The demographics of the current ordering population might be estimated from the type of music being ordered or recognizing the request source, like a request from a "college town" is likely a college request.

The mechanisms to handle active scheduling rely on knowing what selections are currently being requested. Current satellite receivers operated by EchoStar and Hughes communicate by modem with central computers on varying schedules. In some systems, modem connections are infrequent and credit is extended to the customer so that a receiver can order six or eight movies before requiring connection to the billing computers. In other systems, individual receivers might be contacted ("pinged") by the billing computers on a daily basis to check for usage. Active scheduling of music transmission times requires that all or part of the satellite receivers contact the central computer whenever an order is placed. This communication would occur over phone modem, cable modem or Internet and may be initiated without the customer's knowledge. Copies of order records in the central computer must be transferred to a computing system that schedules transmissions, and then schedules must be communicated to the system that feeds music (or video) to the satellite uplink transmitters. If desirable, transmission schedule information can be updated on the consumer interface as soon as schedules are revised, perhaps allowing a consumer to imagine that their order has prompted the system to send a selection more frequently. Schedules are only a fraction of a megabyte in size and may be sent very frequently without significantly impacting bandwidth.

Figure 7:
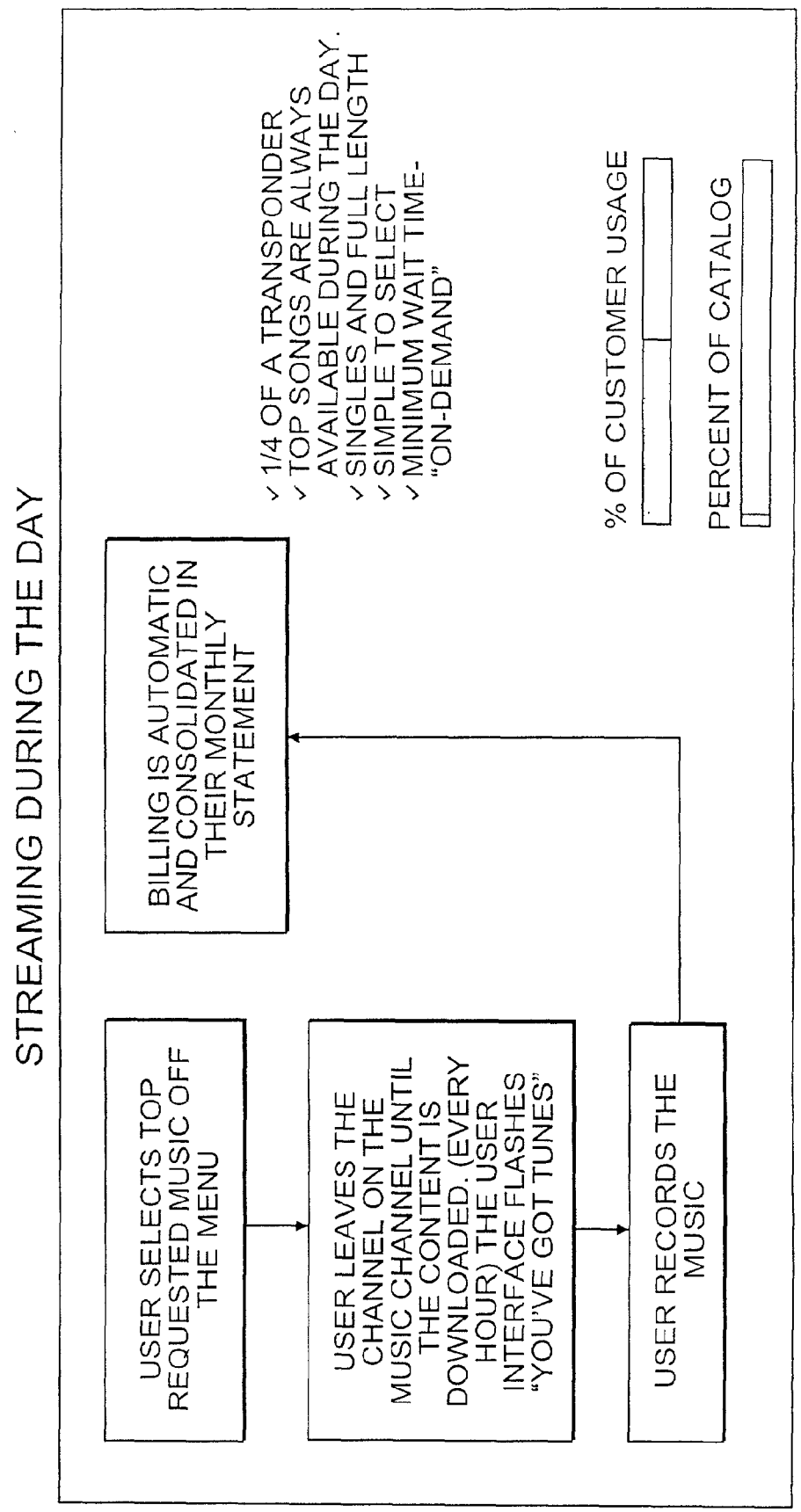
FIG. 7 is a flow sheet showing the manner of music distribution for streaming top hit songs during the day.
Figure 8:
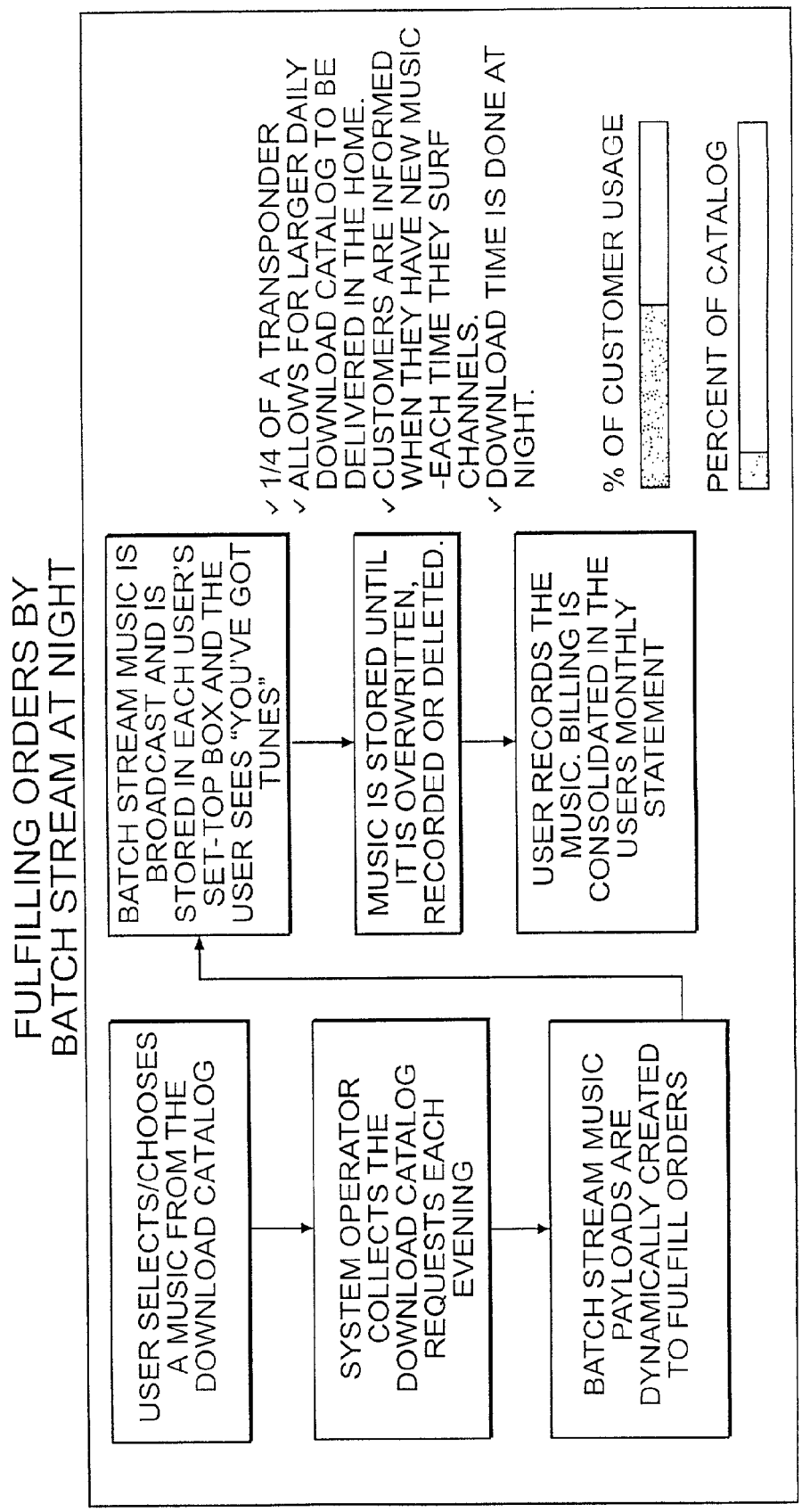
FIG. 8 is a flow sheet showing how orders for musical recordings placed during the previous day are batch streamed at night to fulfill customer orders.

One example of active scheduling of music will be described with reference to FIGS. 7 and 8. According to this example, the top requested music (e.g., new releases and other recordings that are currently most popular) are blanket broadcast ("streamed") every hour. As described above, a customer uses the graphical user interface to select one or more of these recordings for downloading. In certain embodiments, the customer leaves the channel of his DBS (or cable) receiver on the designated "music channel" until the requested recording is downloaded to intermediate storage in storage module 130. When the download is completed, the customer user interface flashes a cue such as "YOU'VE GOT TUNES", following which the customer may permanently record the music, with automatic billing that appears on the customer's consolidated monthly statement. This hourly transmission of top requested recordings may be achieved by utilizing one quarter of a DBS system transponder (or corresponding cable bandwidth) so that top songs are always available during the day with minimal wait for downloading. The recordings may be available as full CD length recordings or single songs. According to this example, a second blanket transmission of music occurs as a "batch stream" at night, for example, from 12:00 AM to 8:00 AM. Customers select music from the download catalog and the system operator collects these selections each evening and uses the information to batch stream the music payloads which may be dynamically created to fulfill the orders. The batch stream music is broadcast and stored in each customer's user station (set top box) and the customer sees a designation such as "YOU'VE GOT TUNES". As with any downloaded music according to this example, music is stored in intermediate storage (storage module 130) until it is overwritten, recorded or deleted. When the customer permanently records the music, billing is consolidated into the customer's monthly statement. The night time batch stream of music may also be achieved with an appropriate dedicated bandwidth, for example, one quarter of a DBS transponder. This technique allows for a larger daily download catalog to be provided in customers' homes. As mentioned, the customers are informed when they have new music, each time they "surf" channels on their DBS (or cable) system.

It will be appreciated that according to this example, the DBS (or cable) receiver is left on the designated music channel until the requested recording is downloaded. However, this scheme may be carried out with a receiver having a microprocessor permitting the receiver to play one channel for. viewing on the television while simultaneously downloading customer requested recordings from the music channel. As will be appreciated by those skilled in the art, the capability of permitting simultaneous television viewing and music downloading via separate channels in the DBS (or cable) receiver is readily achievable by provision of a microprocessor having sufficient processing speed.

6. Use of Intermediate Storage Capability (Storage Module 130) of the User Station to Store Music That Is Available "On Demand" for Permanent Recording As discussed above, storage module 130 of user station 28 includes an intermediate music storage medium (e.g., a hard drive) that stores each music recording that the customer selects for downloading until such time as the customer either makes (and pays for) a permanent copy of the recording (e.g., via a CD burner), the customer deletes the recording from memory, or the recording is written over when the storage medium's capacity is reached (e.g., on a "first in, first out" basis). When the user station is provided with a storage module 130 having a substantial data storage capacity, it is possible for many recordings to be immediately available to the customer for permanent recording. For example, a user station 28 in the form of a DBS (or cable) system "set top box" may have a disk drive with a storage capacity on the order of 17 Gigabytes, with Gigabytes devoted to the intermediate music data storage function of storage module 130. This 8 Gigabyte storage medium permits the storage of approximately 80 compressed CD's at all times in each customer's user station. The customer, therefore, at all times has immediate on-demand access to the approximately 80 CD's in his storage module for permanent recording on his recorder (e.g., CD burner). Music on the hard drive can be stored in encrypted format to prevent loss.

Thus, one advantage of a large storage capacity at storage module 130 is that a customer may download a significant number of recordings for "previewing" as described above, and maintain those recordings in intermediate storage for a considerable period of time before having to make a decision on whether to make (and pay for) permanent copies. However, this large intermediate storage capacity opens up other possibilities, as well. For example, according to one manner of carrying out the invention, the system operator may automatically (i.e., without requiring customer preselection) download certain very popular recordings to every customer storage module on a periodic basis, such as 1 to 10 featured CD's every day. At 5 automatically downloaded CD's per day to each customer, an 80 CD storage capacity and a "first in, first out" write-over protocol would permit each automatically downloaded CD to remain in the intermediate storage of storage module 130 and available for on-demand permanent recording for approximately 15 days, with the exact time depending upon how many customer-selected recordings are downloaded during that period. Thus, over any 15 day period, the system operator may automatically make available (at 5 automatic downloads per day) 75 popular recordings for all customers, without the customers having to preselect anything. Of course, the preselection option for all catalog music remains available at all times. It will be appreciated that the automatic downloading of recordings to all customer user stations can be readily achieved by the system operator simply communicating (e.g., daily) to all user stations the ID header information for that day's automatically downloaded recordings. The user station downloads recordings to the intermediate storage in storage module 130 just as if the recording had been preselected by the customer. The graphical user interface alerts the customer that the recordings are available by a cue such as "YOU'VE GOT TUNES".

7. Using Customer Preference Information

In a more customer-specific manner of carrying out the invention, different sets of recordings are automatically downloaded at customer user stations according to the music preferences of the customer. For example, each customer may use the graphical user interface (see FIG. 9) to select those music styles (e.g., classical, country, new age) they most prefer. The system operator uses this information to tailor the automatic downloads to that customer's user station accordingly. In a simple application, the system operator may create, for example, 10 to 20 standard customer profiles so that each customer receives automatic downloads for the one of those profiles which he most closely matches. The objective is for the intermediate storage to have available for on-demand recording a large percentage of the recordings that any particular customer may be interested in at any given time—or at least have those recordings available to the customer over a period of time as new entries into intermediate storage overwrite older entries, recognizing that at all times the customer is free to order any music selection from the catalog.

Figure 10:
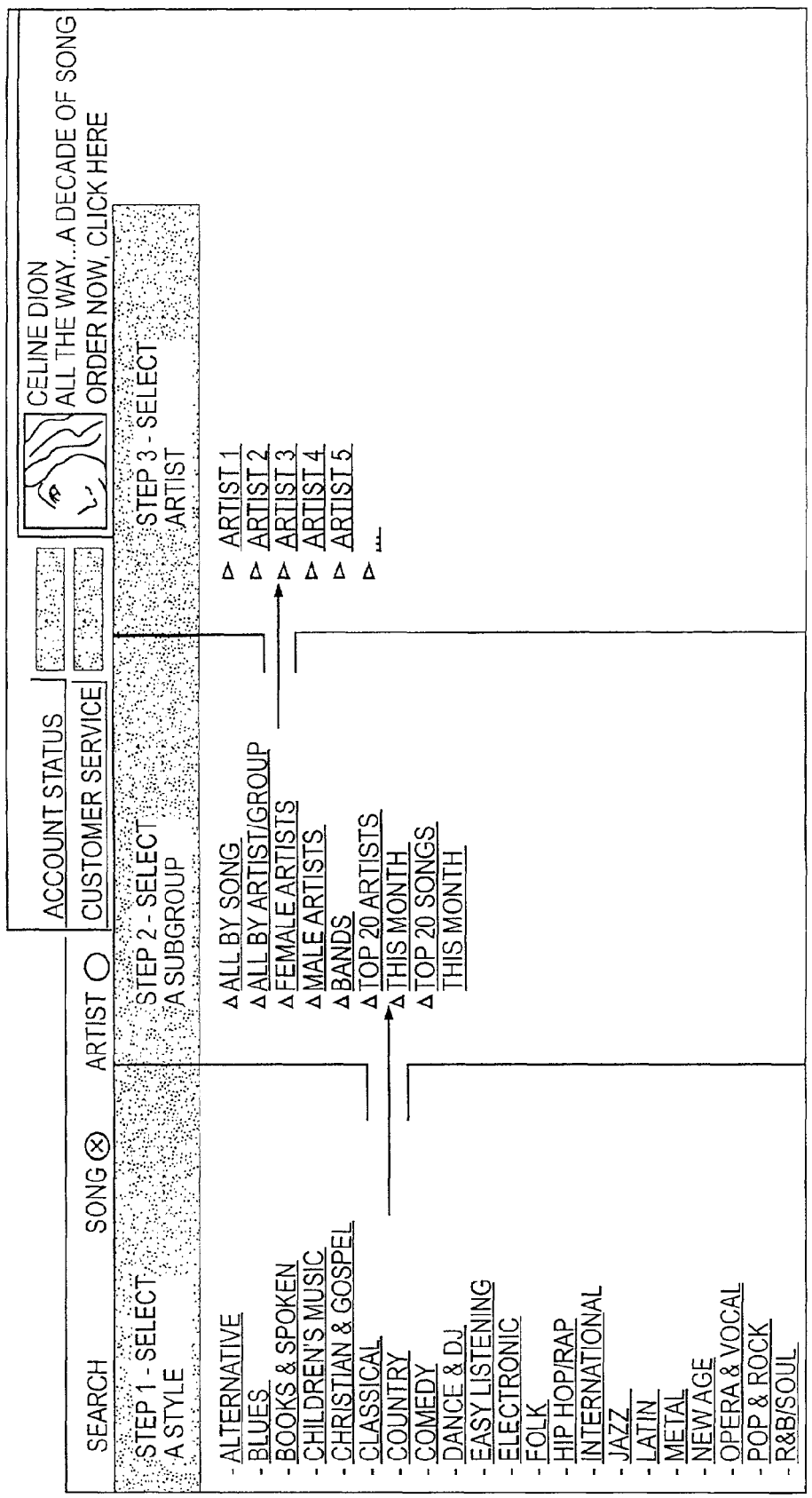
FIG. 10 shows a screen containing another example of a graphical user interface for entering more complex, multi-level customer preference information.

As described above, the system operator may create, for example, 10 to 20 customer profiles and assign each customer to one of these profiles according to music preference information entered by the customer. Thereafter, the customer receives (e.g., daily) the set of automatically downloaded recordings for his particular profile category. However, in other embodiments of the invention, customer preference information may also be used in a more sophisticated fashion to tailor the profiles to the individual tastes of a customer or the tastes of the customer household family members. To this end, the customer may use the graphical user interface (FIG. 10) to enter music preferences at a desired level of detail. As shown in FIG. 10, a first level of detail is the selection of one or several styles of music (similar to the selection made in connection with FIG. 9). In addition, the customer may go to a second step where each selected style may be further subdivided by, for example, female artists, male artists, top twenty-artists this month, top twenty songs this month, etc. A third level of selection permits identification of specific artists. Other means for subdividing interest areas under a particular style of music be used (e.g., jazz/saxophone, classical/opera/tenors). However the expression of musical preferences is made, this information may be used alone, or in conjunction with other information, to permit the customer's user station to download to intermediate memory (e.g., 80 CD capacity) an ongoing, rolling selection of recordings that will most likely match the preferences of the customer.

Figure 11:
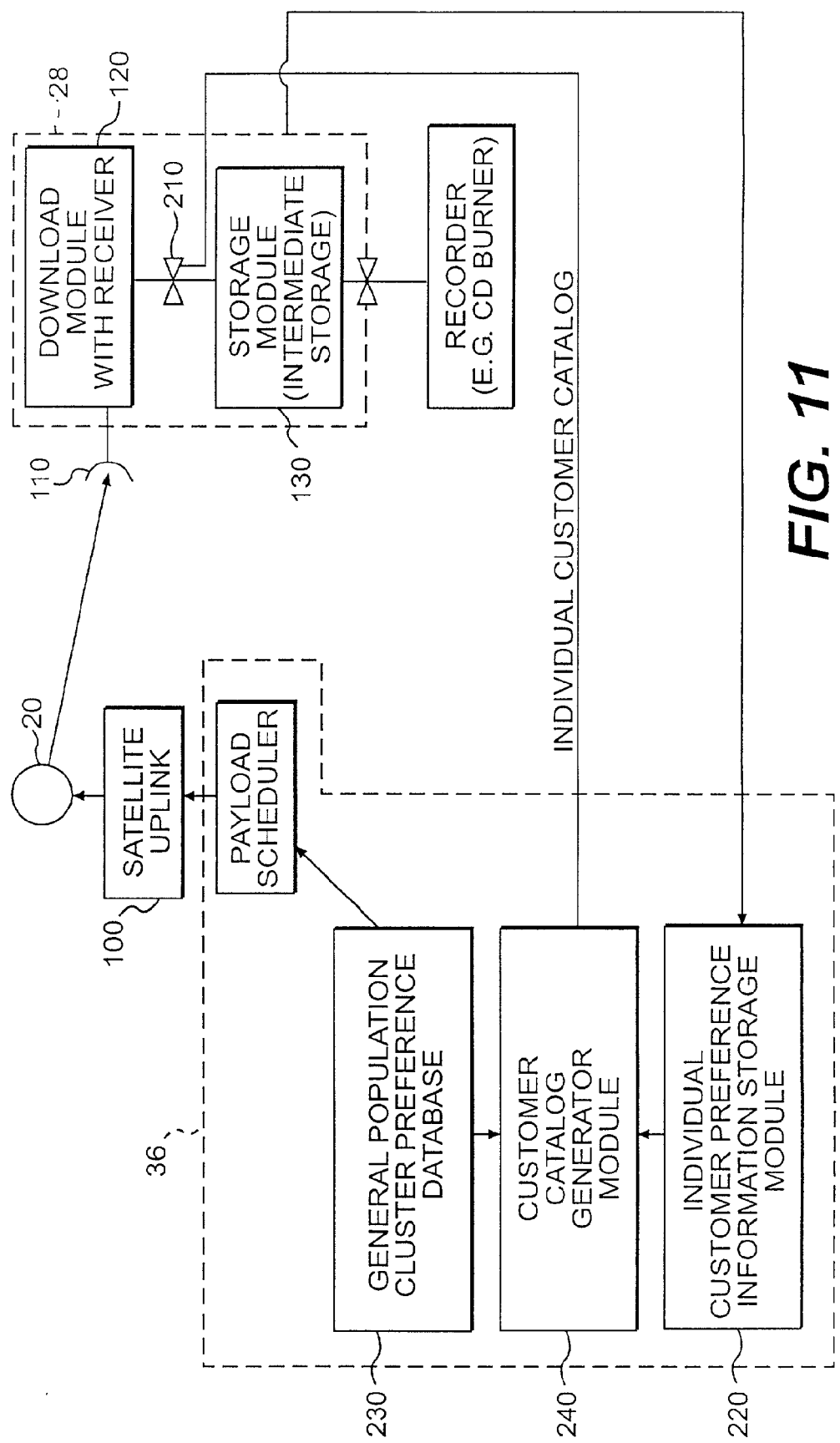
FIG. 11 is a block diagram showing how customer preference information entered by customers and general population clustered preference data compiled and analyzed by the system operator are used to create customized preference-based downloading choices at the customer user stations.

Referring to FIG. 11, there is shown a block diagram that illustrates in schematic form the generation and use of customer preference information. FIG. 11 shows portions of user station 28, namely, the download module 120 with receiver and the storage module 130 for intermediate music storage. The recorder for permanently recording music (e.g., CD burner) is also shown. As schematically shown between user station 28 and storage module 130, apparatus 210 serves to read the ID headers on all of the broadcast music recordings and select for downloading only those that are indicated as being desirable to the customer by the processed music preference information.

FIG. 11 also shows portions of central controller 36 that store and analyze customer preference information and customer order information, and generate from that information the individualized "customer catalog" that determines which recordings will be automatically downloaded at that customer's user station. To this end, controller 36 includes an individual customer preference information storage module 220, a general population cluster preference database 230 and a customer catalog generator module 240. Each customer's preference information is entered in the manner described above via the graphical user interface and is communicated to module 220 by phone/modem. In addition, the preference information of the entire customer population (or some subset thereof), as well as order data, is stored in module 230. Information from modules 220 and 230 is analyzed to create an individual "customer catalog" for each customer via module 240. The individual customer catalog data is communicated to the user station in each customer household and serves to assure that those recordings that best fit the preference customer profile are the ones that are downloaded to storage module 130. While a first-in, first-out protocol may be used for overwriting onto the hard drive of module 130, the customer catalog information may serve to establish a different protocol that will overwrite the less likely to be purchased recordings ahead of those recordings which, by analysis at module 240, show more promise of being purchased. Certain new release recordings in high demand within the customer's primary areas of interest may be designated to remain in intermediate storage for a minimum period of time, say one week, regardless of the "traffic" through storage module 130.

Along with music, there is blanket transmission of catalogs and other advertising or customer interest information. The storage and display of this information may be based on customer profiles. For example, an advertisement for a new CD that is expected to appeal to young adults, country music fans, and customers living in North Carolina would have this information contained in its header, and the receiver would recognize if any of its users are in any of these categories and will appropriately store or not store this advertisement on the hard drive, and may determine to display or not display this ad on the user's TV catalog. Similarly, advertisements for other related merchandise, like Willie Nelson hair bands, might also be displayed. Text describing individual artists or related events might also be stored with the catalog.

Figure 12:
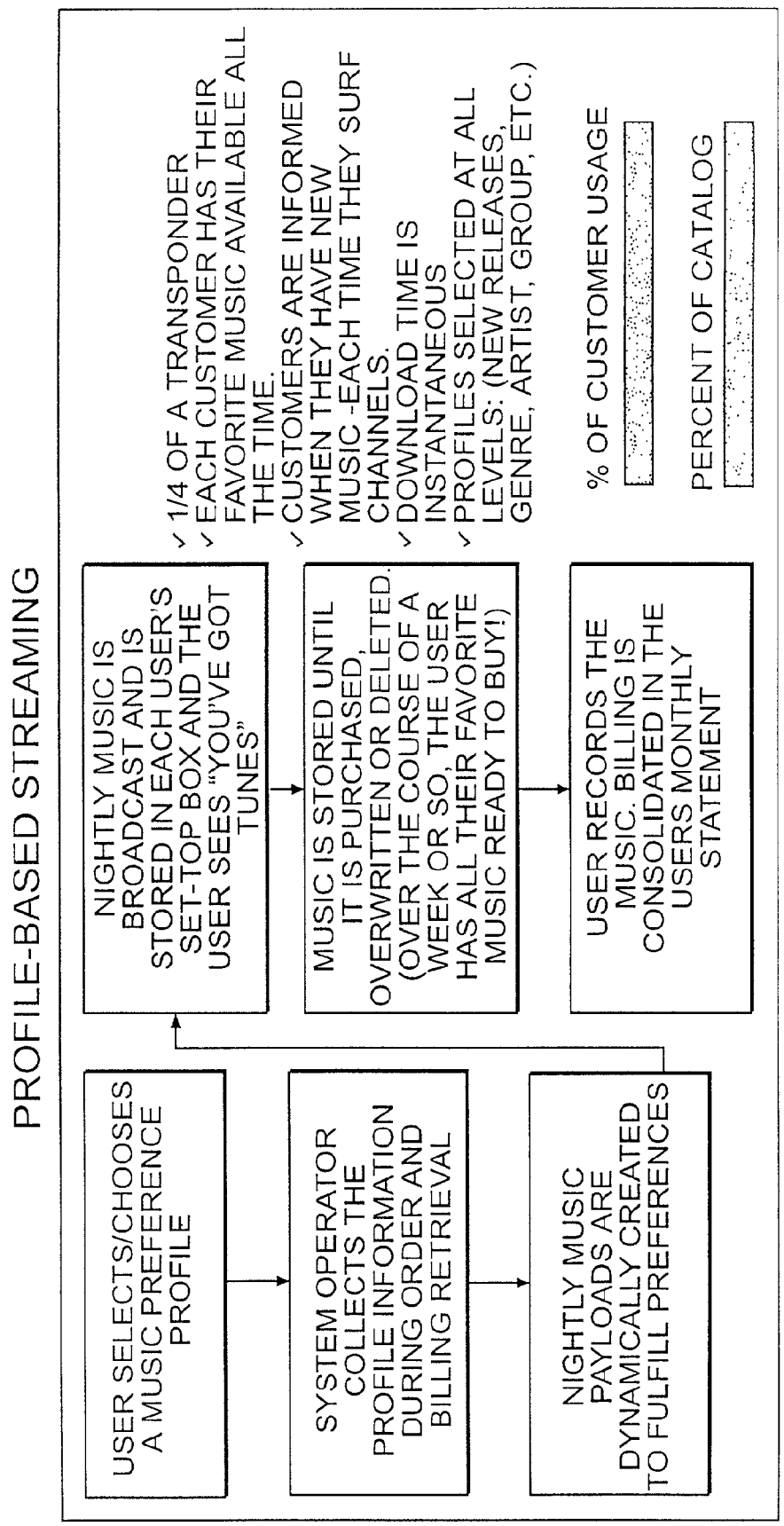
FIG. 12 is a flow sheet showing the streaming of music at night based upon profile analysis.

FIG. 12 is a block diagram showing how the customer profile information is also used to assist in dynamically creating nightly music payloads.

8. Promotional-Based Streaming

Figure 13:
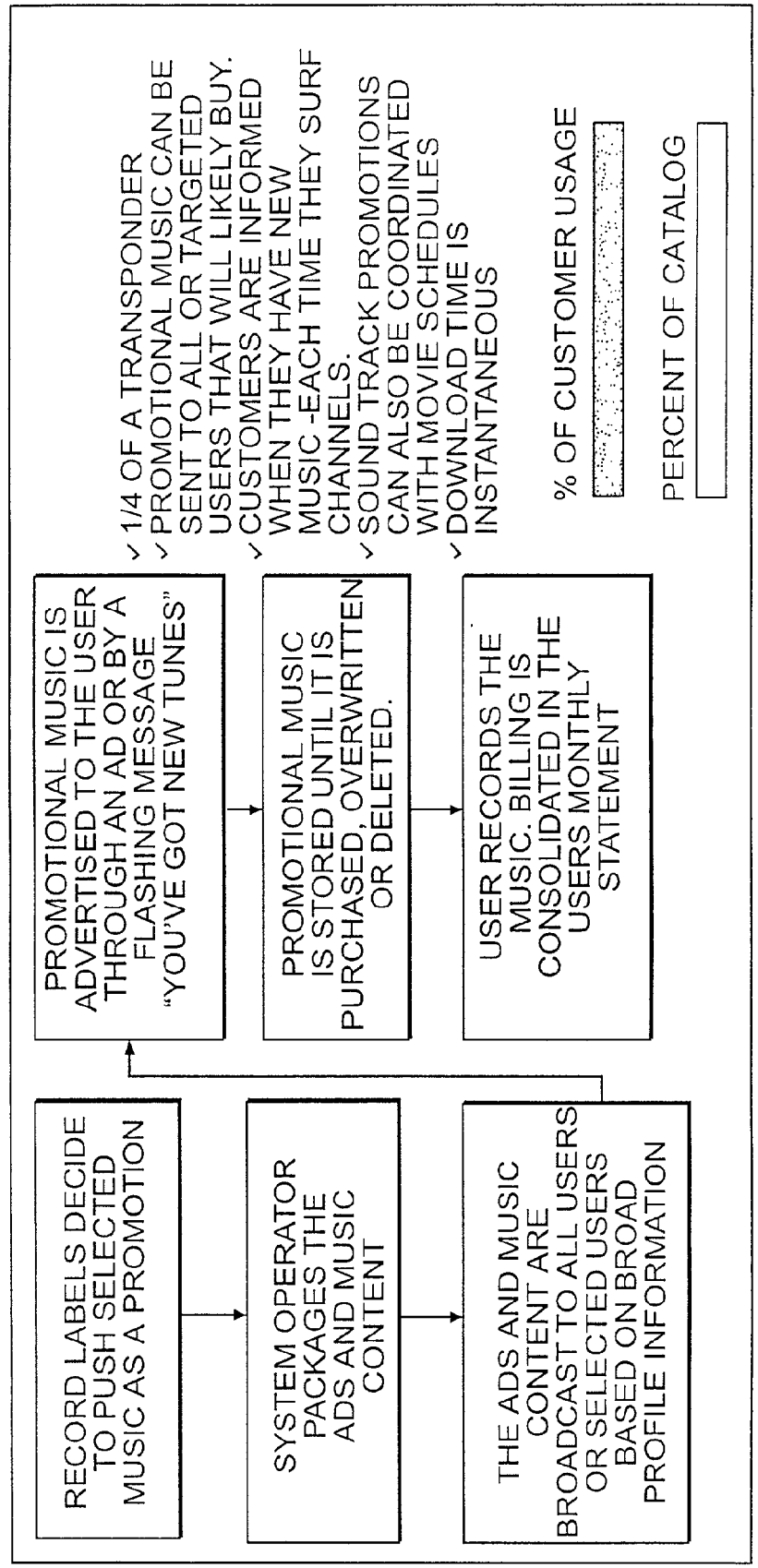
FIG. 13 is a flow sheet showing the procedure for promotion-based streaming of music, for example where a record label decides to push a selected musical recording as a promotion.

FIG. 13 shows the use of promotion-based streaming to download recordings at customer user stations. A content provider (e.g., record label) may decide to push a selected recording as a promotion. The system operator packages the advertisements and music and then broadcasts them for automatic downloading by all customers or by a selected group of customers based on the broad profile information developed by the operator (FIG. 11). The promotional music is advertised to the customers through an advertisement (see top right corner of FIG. 10) or by a flashing message such as, "YOU'VE GOT NEW TUNES". Promotional music is stored in intermediate storage until it is purchased, overwritten or deleted. As with the other means of purchasing music, once the customer permanently records, the billing is consolidated in the customer's monthly statement. Promotional-based streaming may be accomplished LA typically in a relatively short period of time using appropriate bandwidth (e.g., one quarter transponder).

Promotions may include movie soundtracks for movies that are being broadcast by DBS or cable. In this situation, prior to broadcast of the movie, the soundtrack is broadcast and automatically downloaded to all user stations. When the movie is broadcast, viewers of the movie are informed that the soundtrack for the very movie they are viewing is on their hard drive and available for immediate on-demand purchase. Purchases may be made during the movie by appropriate means; for example, a translucent icon may appear on the screen and purchase made by simply clicking on the icon. Or, the purchase can simply be made at the conclusion of the movie where, preferably, viewers are reminded that the soundtrack is available on their hard drive for on-demand purchase.

Figure 14:
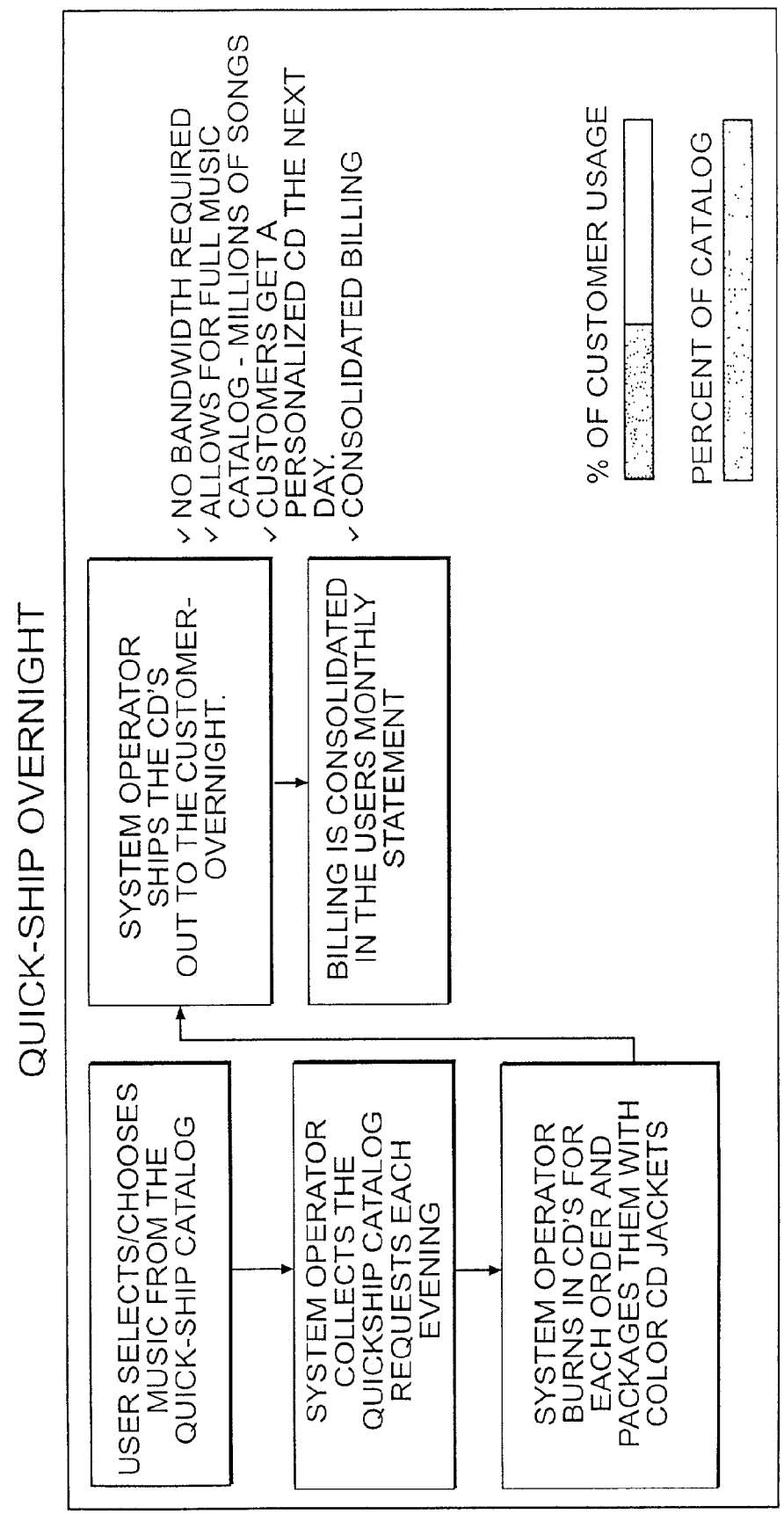
FIG. 14 is a flow sheet showing a procedure for quick-shipping CD recordings overnight from an automated CD production facility.

FIG. 14 shows how an automated CD production facility coupled with a "quick-ship overnight" delivery operation may be used for low volume CD's (i.e., CD's not frequently requested) or for customers who do not have their own CD burner. (Further details of the operation of the facility are discussed later in the specification.) When a customer selects a recording from the quick-ship catalog or a selected recording is designated by the system operator for quick-ship due to low demand that does not justify broadcast, the system operator collects the requests in the evening and then burns in the requested CD's for each order and packages them with color CD jackets. The CD's are shipped to the customers overnight and billing is consolidated into the customer's monthly statement. Advantages of the quick-ship overnight option include the ability to provide CD's without utilizing bandwidth and the provision of the full music catalog that comprises millions of songs, many of which cannot be broadcast.

FIG. 15 is a chart listing the above-described music delivery schemes and showing their respective availability status with respect to customers with and without CD burners.

9. Alternative Embodiment: Use of the User Station (Set Top Box) as a "Digital Jukebox"

Embodiments of the invention described elsewhere herein provide several means for carrying out the blanket transmission and recording of music files for customer playback, including recording blanket transmitted music onto an intermediate storage medium such as a hard disk drive followed by burning of the music files the customer wishes to purchase onto CD's or other conventional storage media, such as DVD's and other optical, magnetic or solid state storage media. However, creation of a musical recording on a conventional medium such as a CD presents certain piracy considerations. As an alternative to these approaches, the blanket broadcasted music that is selected for recording at a particular customer's set top box (by direct customer selection, customer profiling, new release promotion, etc.) is recorded on a relatively large, dedicated portion of a high capacity storage medium such as a hard disk drive from which it is directly accessed by the customer for listening. In this manner, blanket broadcasting of music and selective consumer choice allows the creation of a "digital jukebox" by which consumers have the ability to select music content from a very large music catalog and then select songs to be played from the jukebox. Music is contained in the jukebox in encrypted form on the hard disk drive and is subsequently made available to the consumer as watermarked, analog signals that are paid for before the content leaves the set top box. Jukebox material can also be downloaded to portable, removable media (such as a CD) in encrypted form allowing playing at a remote site by a player capable of tracking and/or limiting the number of times each song is played. The resulting system provides consumers access to a very large content library that can be played as a play list in any sequence and at any time, for example, continuous playback, shuffle, sort-by-artist, etc. This also allows content providers the ability to control their libraries and structure royalty agreements with artists on any suitable terms, including a per-play CD, or per-song basis.

According to this alternative embodiment, music is transmitted in compressed and encoded format, preferably via satellite. As described elsewhere herein, music may be broadcast continuously or nightly by a tier-based system that accounts for the popularity and newness of the music. Each customer has a receiver to receive the blanket music broadcast. Songs are stored in compressed, encrypted format on the receiver's hard disk drive. Typically, sixty minutes of songs in compressed format would occupy about 50 megabytes so that twenty hours of music may be stored in 1 gigabyte of space on a hard disk drive. Songs are heard by a selection being decrypted, decompressed and watermarked in the set-top box and then outputted as an analog voltage at a connector on the box. The customer may listen to the music through headphones or through their audio system connecting to the audio output connector on the set-top box. Other embodiments may use a wireless connection to the box such as an infrared, RF or house wiring link. In all cases the audio signal leaving the box preferably is watermarked.

Customers select the songs to be recorded on the hard disk drive of their "jukebox" generally in the manner described above by using a graphical interface on their TV or by signing up with a subscription service that keeps their jukebox filled with music matching their profile or interests. Songs may be added as albums or as individual songs. Additional songs may also be downloaded as preview material or placed on set top boxes requested by the content provider to acquaint customers with new material.

Multiple methods may be employed for charging customers for listening to the music. Customers may be charged on a per-play for each song, or may be charged as a monthly subscription such as $5 per month for 100 playings of any songs. Actual billing may be part of monthly fees for the set-top box or credit may be advanced to the customer. Similarly, a customer may outright purchase a group of songs or a CD. In the case of a purchase, an unencrypted copy of the CD can be given to the customer either by recording the CD at his set top box or by shipping him a CD by mail.

Separate from charging the customer, demographics of the playing of songs may be recorded by the system and uploaded on a weekly or monthly basis to central controller 36 for the purpose of compiling individual user profile data or group song selection demographics. Similarly, non-customer specific data may be used to reimburse artists based upon the number of times their songs have been played by customers.

Customers may also be given the option to take music to locations remote from their house by recording the encrypted and compressed songs on a CD using the same read/write technology that is on their set top box for handling video or data. Music stored on a removable CD may be stored in compressed format, in which case about ten hours of songs could be stored on one CD, or in non-compressed format, in which case about seventy minutes could be stored. In either case, preferably encryption is used to prevent non-system devices from playing the music. The decision to compress or not compress may be made based on the hardware, hence cost, available on the playback system for doing decompression. Portable players may be devices capable of reading CD's with the additional capacity of playing back movies. This same device could read a music CD, decompress and decrypt the music and output the music with watermarking to an audio connection for headphone, speaker or hifi listening. Watermarking may be done in the set top box prior to recording the removable media and/or by the playback device. A description of portable players for music and/or movies and their use in conjunction with this invention is described in commonly assigned application Ser. No. 09/675,025, filed Sep. 28, 2000, entitled "Video Distribution System", incorporated herein by reference in its entirety.

Figure 16:
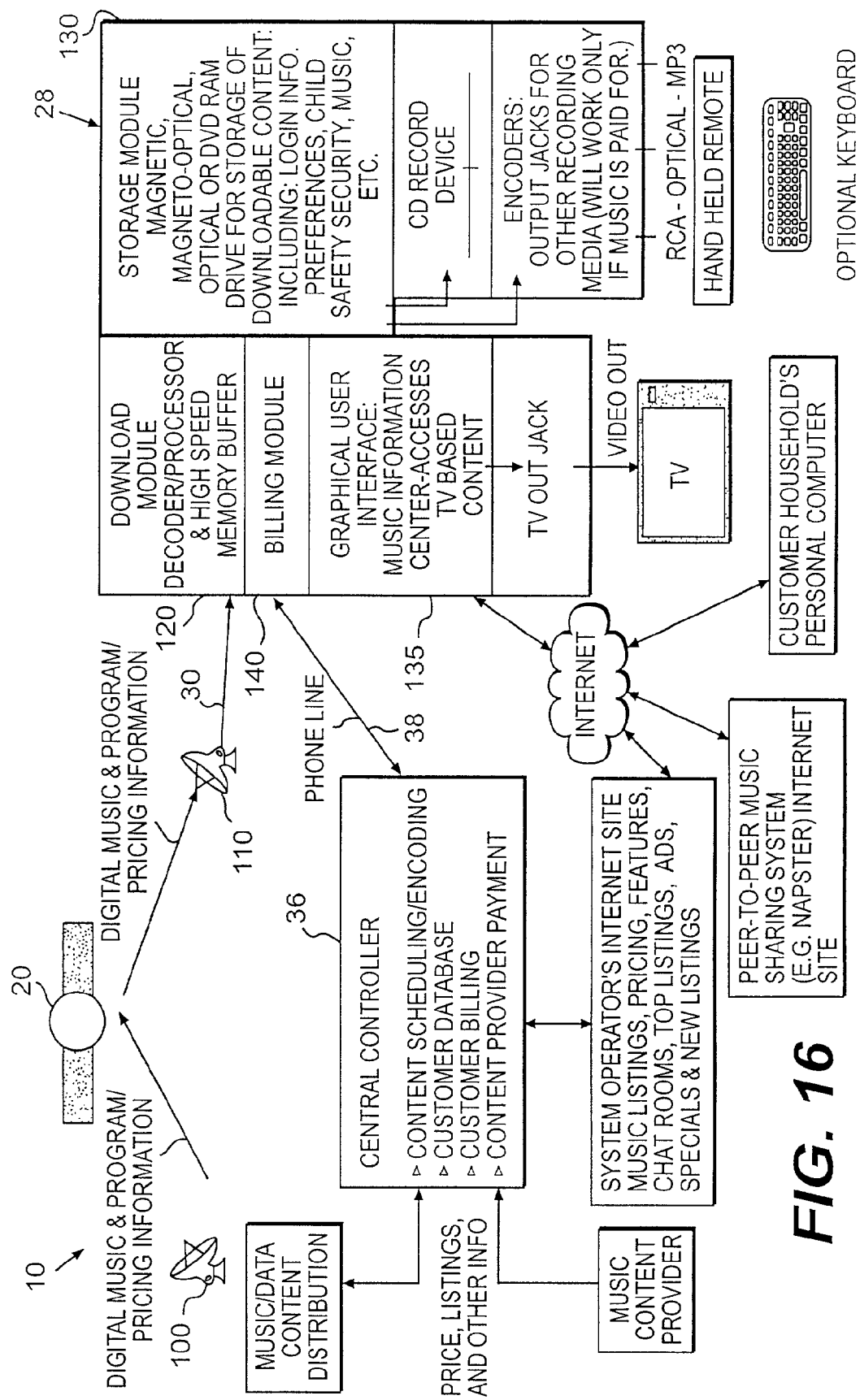
FIG. 16 is a schematic representation of another music distribution system that operates in conjunction with a peer-to-peer music sharing system (e.g., Napster) to permit customers of the music distribution system who are also users of the peer-to-peer music sharing system to have enhanced options for ordering and receiving music.

10. Alternative Embodiment: Utilizing Internet Peer-to-Peer Music Sharing Systems (e.g., Napster) In Conjunction with the Present Invention (FIG. 16)

As is well known in the art, peer-to-peer music sharing systems using internet communication have evolved. One such system, Napster, functions by having each user run client software acquired from Napster. A user running this software can access a central catalog from a Napster internet site that describes what songs are currently available from users currently logged onto the Napster file sharing system. After selecting desired song(s) the user is connected to the address of another user currently logged into Napster and running the Napster client software. The sharing software then negotiates transmission of the requested song from the second user's computer to the first user's computer. The transferred music may or may not be copyrighted. Song quality depends upon many factors including the quality of the recording at the "donor's" computer, the connection between the donor's computer and the internet, and the donor allowing the Napster software the time to complete the transmission of the music. Because many Napster connections involve modem/phone line connections at one or both computers, only limited amounts of music can be transmitted in a reasonable time. This peer-to-peer music sharing scheme is dependent upon donor libraries which usually contain individual songs rather than full length albums, and a person who wishes to receive all the songs on a CD may have to visit several computers several times to acquire them.

In accordance with the invention, customers of the music distribution systems described herein who are also users of a peer-to-peer music sharing system may utilize the features of both systems to enhance the variety and quality of the music available to them. In one representative embodiment, users of a peer-to-peer music sharing system are informed by an icon or highlight within the peer-to-peer system catalog whenever catalog selections are available in their entirety in full-quality form through normal blanket broadcasts (or shipment by mail). Available music selection information is provided to the peer-to-peer system by the music distribution system operator. By simply clicking on the icon (or highlighted selection) while at the peer-to-peer music sharing system website, an order for the selection is communicated to the central controller, 36, via the internet or other suitable means (see FIG. 16).

This same embodiment is a business system that benefits all stakeholders, the content providers, the owner of the peer-to-peer distribution system, the owner of the blanket broadcasting system, and the user by providing advertising of music that can be provided in high-quality, fully-legal digital form to customers by a convenient method, while reimbursing content providers for copies of their music that are distributed to customers. This embodiment may provide for payments to the peer-to-peer music system operator receives revenues for advertising and making music available for purchase. Customers may also perceive benefit from the having the payment for the music made through a secure, familiar and simple process offered by the music distribution system operator.

Over time it is likely that peer-to-peer sharing of music over the internet will change as the capacity of digital mass storage increases. If the trend of hard disk capacity continues as it has recently (130% increase in capacity per year), it is likely that in three years 400 gigabyte hard drives will be available for less than $100. This capacity allows compressed storage of approximately 1000 hours of music or about 1000 CD's so that a much greater range of music can be cached on a customer's hard drive for the customer's later trial, selection and playing on a pay-to-own, pay-per-play or subscription basis. Information about prior selection and purchase of music may be used to profile the customer and place music that is most likely to appeal to them on their storage system, as described elsewhere herein. In this situation, the peer-to-peer music sharing system might provide customer preference information to the system operator to allow customer demographics and profiles to be estimated.

In a modified embodiment, the music distribution system provider may broadcast the catalog of music that is scheduled for blanket broadcasting (the "carousel album content") to cell phones, Palm Pilots and other PDA/wireless devices in a real time environment using WAP (wireless application protocol), internet protocols or other real time communications. Customers using these devices may request the download of music content through the approximate blanket transmission medium, e.g., direct broadcast satellite, cable, DSL or Internet.

11. Ensuring Flawless CD's Using Checksums and Multiple Downloads

Satellite receivers do not have perfect reception due to the tradeoff between electrical power and bandwidth of the satellite. Weather conditions, motion of atmosphere layers or obstructions between the dish and the satellite may interrupt the signal. A momentary loss of bits will cause a TV image to freeze for a frame or two, while longer interruptions will cause reception to blank. Whereas a short loss in video is a couple of frozen frames, data loss in audio may leave a glaring blank in the music. Therefore, a satellite system for transmission of audio or software (or video) CD's requires a method to detect and fix data losses at the receiver.

Patching data "potholes" requires a method for sensing potholes and another for placing asphalt to fill them. Typically, digital data is sent in packets of bits (perhaps one thousand bits at a time with each packet containing 1/40 second of music). Loss of bits within a packet can be detected by error codes or merely a "checksum" at the end of the packet which indicates the sum of all the sent bits. Each packet may have an identifying number so that loss of an entire packet is noticed. This is all conventional Internet technology.

Repairing data loss might be accomplished by replacing an occasional packet by the receiver asking for a copy of the packet via an Internet or modem phone connection. However, the frequency of data loss and amount of contiguous data might be lost (for instance, during a rainstorm), requires a wider bandwidth, like the satellite, to provide the material to repair data loss.

Therefore, in certain embodiments, the present invention provides the capability in the system to detect bit losses and receive a second copy of the selection and use all or part of that copy to patch the missing or corrupted bits or packets in the original download. This would require storing a requested download on the storage medium (e.g., hard drive), checking for missing data, informing the customer that the download was imperfect (allowing the customer to burn a CD, listen to a preview or wait for a second transmission), then receiving and storing all or part of a second (or rarely a third) transmission, and then selecting good packets of bits to make up the final copy.

In practice, a customer selects a CD via the TV-remote interface and the TV screen notes a download, say, 45 minutes later. As soon as the download is completed, the customer is informed of the quality of the download (A, B, C, D) and informed of the time of the next transmission of the material. The customer is then allowed to preview the corrupted version, or even burn a CD if they wished.

12. Distributing Low Request CD's Via an Automated CD Production Facility

In conjunction with blanket transmission of more popular music, a central facility (FIG. 6) may be provided to manufacture low-volume CD's (i.e., CD's that are not frequently requested) and distribute them by ground transportation. A system of the invention that includes such a production facility carries low-volume products from record company master music libraries to meet the needs of those companies to sell all of their archives. Typical satellite costs may require at least 5 to 10 purchases per satellite transmission to pay for the transmission costs. Backing satellite transmission with shipped CD's also provides CD's for locations where poor satellite reception makes it difficult to get a clean CD download, or to people who do not have a dish. Preferably, the automated burner facility:

a. takes orders from receivers with modems or via an Internet site;

b. has electronic access to the music libraries of the satellite system via Internet or local storage;

c. has totally automated CD burners, CD painters, jacket printers, packaging, labeling, shipping and billing;

d. encodes ID tags/watermarks in all manufactured CD's to deter illegal copying; and e. is located at a single central or multiple regional locations.

Because each CD is manufactured upon request from blank writeable CD's, totally automated production and distribution is possible resulting in low production and distribution costs compared to a typical CD store. The facility may also manufacture music recordings on other media such as DVD's, MD's and other digital media. Additionally, the facility could manufacture videos and software.

13. Piracy Protection

The threat of piracy can be controlled through a music distribution system that uniquely labels every legal CD copy of music (or video) with an "ID tag". Thus, if a customer sells copies of a CD that he purchased, that copy and any copies of it can be traced to his original purchase. Such identification serves as the basis of a legal deterrent for large or small-scale piracy. Furthermore, the ID tag may be contained in each song of a CD protecting each complete piece of artistic material. The ID tag may be as simple as an inaudible millisecond blip at the start of each selection or may be "woven" into the music so that it survives re-recording and compression schemes by being integral to the music, but not noticeable to the listener or easily discovered and removed by potential pirates. Multiple hidden tags may be used to discourage attempts to remove the code by comparing multiple legal copies of the music. Similarly, multiple tags also provide the advantage of identifying illegal copies in those cases where a pirate successfully removes some, but not all, of the tags. At worst, a pirate may successfully remove part of the tags making it possible to determine that the music copy is illegal, but without identifying the original purchaser.

Distributing music that contains unique ID tags limits piracy by making it possible to prove that a CD is an illegal copy and makes the legal source of the copy identifiable. This technology makes it financially feasible to distribute full-quality CD music (or video) to consumers via direct satellite connections in the manner described above in connection with FIGS. 1-4. Furthermore, by placing tags in each song, it makes it possible to have a protected system of allowing consumers to create unique assortments of songs on a CD, and for artists and distributors (content providers) to receive revenues for each song used. Thus, each home can become a "CD or music factory" where a person can create their own collection of songs by artists, through a system in which the original artist and distributor are properly paid for their materials. Furthermore, the decline in piracy resulting from the threat of legal prosecution could result in more legal copies of music being purchased so that providers can charge less per legal copy so that this art is more widely available.

Two major venues contemplated for distribution of protected CD's are the Internet and satellite. In the Internet case, a customer contacts an Internet site where they purchase the CD. The site places ID Tags in the music or video selected, then compresses the selection and sends it to the purchaser. The purchaser then de-compresses (inflates) the selection and stores it on his hard drive or writes it to a blank CD for later playing. In the case of satellite distribution, a customer contracts over a phone or Internet connection to purchase a particular CD. At scheduled times, perhaps once a day, the satellite company compresses this CD, encrypts it and then blanket broadcasts it. The customer's receiver (e.g., user station 28, above) stores the transmission and then de-encrypts it using a system and key supplied by the satellite company, and then that same system encodes an ID tag in the music (or soundtrack) using a tag number downloaded from the satellite company during the purchasing transaction. Both the Internet delivery system and the satellite delivery system create a customer CD that may be played on any conventional CD player. Both the Internet and satellite distribution systems archive the ID tag information with the customer's identity and perhaps other aspects of the transaction. This data may be sent back to the original content provider or to another company specializing in detecting and prosecuting pirates.

The above scheme may also be applied to CD's sold in stores. In this case, each CD has a unique ID tag encoded before it is distributed to the store. The CD case has a bar code associated with the ID Tag. At the time of purchase the bar code is associated with a customer's charge card or identity. This information is then sent back to the CD manufacturer.

It will be appreciated that it is possible to encode an ID tag into a music selection so that it will not be heard during normal playback, but could remain and be detectable in a recording made from a selection played over the radio.

The description will now turn to a detailed discussion of representative ID tags. As stated above, an ID tag uniquely identifies each copy of music or video. In its most simple form, a 10 digit (37 bit) tag may be stored in three 16-bit samples (1/12,000 of a second long) on a CD. A three-byte tag number equivalent to full volume is a barely perceptible pop to young, sensitive ears and is completely inaudible to the majority of the population. In a more complex form, the tag may be woven into the frequency or time spectrum of the music, where it is both inaudible and survives compression and transmission, or even serious attempts by hackers to remove the tag. While the simple tag may be appropriate for certain applications, more complex tags may be desired for other applications, especially for high-profit, piracy-prone contemporary music (or video).

A simple tag, as discussed immediately above, may consist of three 16-bit numbers placed at the start and/or end instant of a CD or each of its songs. To limit audibility, the 37 bits may be carried by the 64 bits of the first four samples at the beginning of the CD and encoded to have low amplitude or alternating polarity to further hide its audible presence from consumers. Such a tag may be easily read by a computer and is not difficult to eliminate when making copies. However, the technical nature of tag removal coupled with the legal implications of distributing software capable of destroying the tag serves as a significant deterrent to general piracy.

The complex ID tag is inaudible by humans, yet is sufficiently integral to the music (or video) that it remains during simple filtering or compression operations. The ID tag may be a multidigit number (or collection of bits) that can be read or recovered from the CD by those who originally placed the tag. Examples of tags are low bit-rate encoding in low amplitude, increase or reduction of high frequency music content, short-duration ratios of harmonic components, background sounds, slight shortening or lengthening of sustained sounds, or even localization cues or echoes for a sound object. Key to "hiding" the sounds is to encode the bits as short duration shifts in the sounds, shifts that are preserved during compression but that are not detectable by normal human hearing or attention. In other words, it is desirable to take advantage of the parts of the music that have "excess information" coded during sound compression that is not noticed by humans.

To make the complex tag hidden and recoverable additional information may be used in reading the tag that is not contained in the CD. This information describes where the real (or perhaps false) ID tags are to be placed, and what the nature of the bit encoding is at that location. The simplest form of location would be milliseconds from the start or end of the song for each bit. Similarly, time from a particular feature in a song, like milliseconds after the attack greater than 20 dB about 23 seconds into the song, could be used to identify the location of one bit of an ID tag. Obviously many bits are also encoded that obscure the actual tag bits. Real and actual bits may be different or interchanged among different legal copies of a song.

It should be expected that as music (or video) compression techniques evolve, methods for placing and retrieving ID tags will also evolve.

In its simplest form, the ID tag is a unique identifying number, ID number, that is placed at the start, end or between selections on a copy of the CD when it is produced for the consumer. As stated above, a unique ID number might be placed on each CD as it is manufactured and later associated with a customer name or credit card during a store purchase. Or, in one preferred manner of carrying out the inventions, the ID number might be inserted during the process of writing a CD with music that is downloaded from a satellite or the Internet. In this case, the software accomplishing the transaction to purchase the music also sees that the ID number is obtained from the seller and places this ID number at appropriate places in the CD during the recording process.

Looking at a more complex form of the ID tag, when a legal CD is distributed over the Internet, via direct satellite transmission or even CD's that are manufactured for sale in CD stores, preferably two blocks of information are involved. The first block, called the "location data", is an encrypted description of all the locations in the music to contain the entire or part of the ID tag, and the encoding techniques used for each location in which false or real bits of the ID tag will be placed. The location data is used in creating or reading the ID number but is not stored on the CD. The second block of information, called the ID number, is a unique number identifying the legal transaction. The ID number may be a customer identification number, like a credit card or phone number, or customer purchasing account number, or may be a seller generated transaction number. There are many different schemes for filling redundant ID tags encoded on a CD so that tampering or removal of any tag or part of a tag is noticed.

Some types of tags may be placed in the time domain and others in the frequency domain. Time domain tags may involve changing an aspect of a time-domain feature like the decay time for a note, whereas frequency domain features such as amplitude of an overtone would be better inserted in a frequency domain transform like the fast Fourier transform used to do MPEG compression. The amount of computer speed needed to insert frequency domain tags has only been recently available in consumer computers.

Location data is communicated to a "home music factory" (e.g., user station 28) as encrypted information sent with the compressed music. If an ID number were 10 digits (about 33 bits) long then perhaps just 33 or several hundred locations would be contained in the location data. Software may accomplish this task at the site of music distribution, picking regions of the sound that are suitable for hiding bits within, or trial bits may be encoded by software with trained observers, perhaps the person who mixed or originated the music confirming that the music was not degraded by the inclusion of the bits.

ID numbers would be contained in the music factory as a standard ID number or as a number securely given to the purchaser during the purchase transaction. One number might be given for a whole CD or individual numbers for each song on the CD might be given.

The customer's security information should not only contain the location data and ID tag but instructions for creating each type of encoding of a bit in the fabric of the music. Types and encoding of bits may be kept secret so that the search and removal of encoded ID's will be more difficult. It is also likely that types of encoded cues will evolve over time.

Note that a unique ID tag can be encoded in the manufacture of a CD for sales in a store as well as a bar coded copy on the CD box allowing association of a purchaser's identity (or credit card number) with that legal copy. Similarly CD's delivered in compressed form over the Internet can have the complex tags woven into the audio at the delivery end. Complex tags can be designed that are not affected by the compression-decompression process.

A simple ID tag consisting of three two-byte samples could easily, but illegally, be eliminated during a piracy operation with the proper software. However the more complex encoding schemes are very difficult to find in order to eliminate or change it.

To be immune from destruction the encoded bits need not affect a person's perception of the music. This is not difficult since the information content of even compressed music is orders of magnitude beyond the capacity of humans to take in information. However, since humans attend to different aspects of music at different times, encoding must be carefully done.

Hints of types of acceptable encoding come from knowledge of what aspects of sound are most carefully attended by humans. For example, quick rise-times or strong attacks are carefully processed for localization cues, and frequency or pitch can be sensed with great accuracy by some persons. The literature on the development of music compression algorithms contains discussions of what aspects of music must be carefully preserved and what is less noticed but nevertheless kept due to the need to preserve other, similar, features in the encoding.

It will be appreciated that it is possible to place both a simple and a complex ID number on a CD as a method to determine the purchaser of a CD that was subsequently altered and copied.

A final matter with respect to antipiracy protection is that the "hidden" ID tag data in the music should survive compression. By way of background, music (or audio) is typically made digital by sampling the music 44,000 times a second with a resolution of 16 to 20 bits. The number of samples is necessary to record the highest frequencies, the resolution allows 90 to 120 db of dynamic range above noise. All compression techniques reduce the information necessary to digitally communicate the music. The primary basis of commercial compression techniques is to reduce resolution in frequency bands that will be least noticed by the human ear. This is true for ISO/MPEG, Sony ATRAC and Phillips PASC. To achieve the five or ten fold compression, all these techniques work with 500 to 1000 point blocks of samples (10 to 20 milliseconds), establish a realistic resolution for each of 30 to 50 frequency bands based upon the threshold of human hearing and masking by sounds of similar pitch, and then represent the various spectral components of the sound with as few bits as possible. For example, ATRAC averages 2.8 bits per sample to get the equivalent of 20 bits pre sample of resolution. Some compression techniques also make use of redundancy between stereo channels. Thus, all common compression techniques focus a minimum number of bits to represent each 10 to 20 milliseconds of sound, and trying to place an ID tag or "watermark" in this texture will likely affect the sound. Compression methods work with small chunks of sound because computation required for spectral filtering techniques (like the FFT) increases drastically as samples lengthen, and because this sort of compression represents the "low hanging fruit" in reducing the data needed to convey sounds. With compression focused on the information in short blocks of sound it is a good strategy to look for ID tag/watermarking methods that are inaudible features that extend across blocks and are therefore to be unaffected by compression. Current audio watermarking techniques convey information by putting notches in high frequency sounds, low amplitude sounds spectrally adjacent to louder tones, influencing least significant bits of encoding and short echoes. Known watermarking techniques place marks within the single blocks of sound to be compressed. Several aspects of the ID tag/watermarking aspect of the present invention differ from conventional watermarking:

a. it is necessary to convey only a couple of dozen bits in a song;
b. an entire song may be held and processed at once in memory (e.g., hard disk) with substantial processing power being available to do the watermarking; and
c. the location and nature of the watermarking sites can be kept confidential.

According to the invention, ID tags/watermarks may be based upon undetectable changes, located by features in the referenced to the rough length of the piece. These features may be subtle shifts in the texture of the music, like relative amplitude between channels of a narrow range of frequencies, or duration of time between features. While the ear is very sensitive to time interaurally or as a component of the onset of a sound, time is looser with respect to time between features in the music, yet time is precisely preserved by compression techniques. It is theoretically possible to time the duration between two attacks to 20 microseconds. In practical terms, noticing a 50% rise in a 500 Hz attack may be timed to less than 200 microseconds. In contrast the time scale that humans perceive the timing of sequential events is in the range of 10 milliseconds (10000 microseconds), opening a 50:1 window for encoding and perceiving slight timing shifts that carry an ID tag. Attacks may be used because they are both easy to detect and have sharp temporal features allowing accurate determination of time to make interval measurement more precise. In practice, ten digits may be encoded between 10 to 30 attacks by slightly lengthening the duration of sound between attacks without any alterations in pitch. To accomplish this task, software must recognize the existence of attacks and simple decays that can be extended. In some sorts of music, like single instrument works, this is simple. Other types of music typically require more work to achieve without any perceptible alteration in the music. In this regard, vocoder technologies that can stretch time without altering pitch provide existing techniques for accomplishing this. After a pair of attacks had been located in the music, these locations are measured as a fraction of the duration of the entire selection. The length of the delay encodes one or several bits of the ID tag. Then an appropriate length of the music between the two attacks is lengthened the desired amount, say 500 microseconds. The lengthening preferably is applied to all channels of the music. To read an ID tag, the original pairs of attacks are approximately located as a fraction of the duration of the whole selection. Then the attacks are exactly located by moving forward several milliseconds in the altered music until they are recognized and their positions pinpointed. The duration between is measured and compared to the original amount. Added or removed time codes individual bits or digits. Subsequent pairs may be located relative to earlier skewed pairs.

It will be appreciated that security of the music may be enhanced by periodically changing the encryption keys. For example, when using satellite as the blanket transmission means, 1024 bit RSA encryption keys may be used and changed periodically, with the changes being downloaded to the satellite receivers of the customers.

14. Business Models

Figure 5:
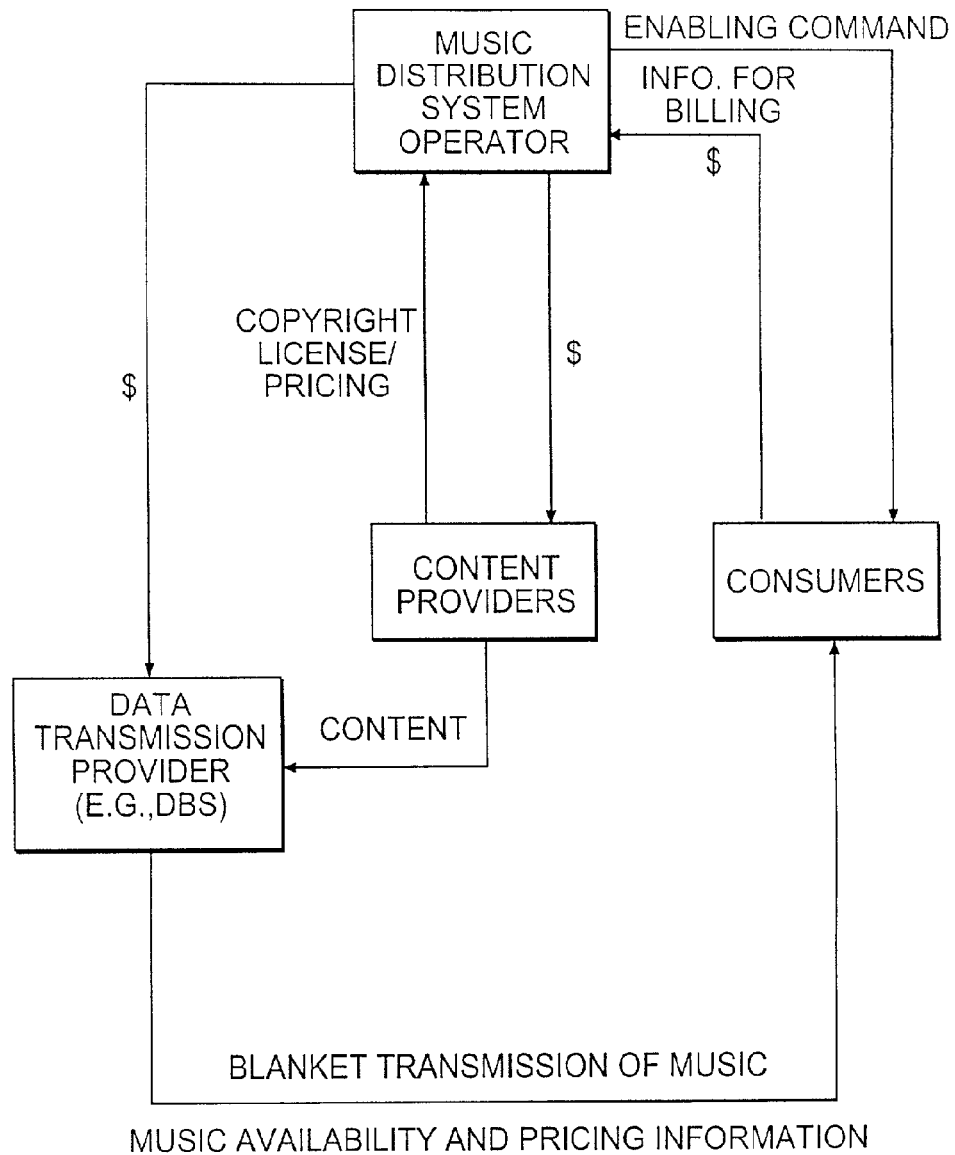
FIG. 5 is a block diagram of one simplified embodiment of a business model for commercializing a music distribution system.

The present invention provides significant flexibility with respect to the business model to be used to commercialize the invention. In one simplified embodiment, shown in block diagram form in FIG. 5, the music distribution system operator interfaces with three parties, the data transmission provider, the content providers, and consumers. The content providers provide content to the data transmission provider which, in turn, blanket transmits the content to the consumers, preferably by direct broadcast satellite. The satellite transmission also includes content availability/scheduling data and content pricing data, updated periodically. The content providers also provide copyright license and pricing requirements to the music distribution system operator. Both the data transmission provider and the content providers receive payments directly from the music distribution system operator. Lastly, the music distribution system operator periodically receives information for billing, while also sending enabling commands to the consumers.

While the present invention has been described in connection with certain illustrated embodiments, it will be appreciated that modifications may be made without departing from the true spirit and scope of the invention.

The invention claimed is:

1. A method comprising:
    transmitting an indication to a consumer station that a music selection is available for transmission to an intermediate storage medium at a consumer site via a music sharing system, wherein the consumer station is configured to display an indication within a catalog of the music sharing system that the music selection is available for transmission to the intermediate storage medium;
    receiving a consumer request for the music selection, wherein the consumer station is further configured to send the consumer request in response to a consumer selection of the music selection without requiring further consumer interaction;
    responsive to receiving the consumer request, transmitting the music selection to the intermediate storage medium;
    receiving an indication that at least a portion of the music selection has been recorded on the intermediate storage medium and subsequently recorded on a permanent storage medium located at the consumer site; and
    responsive to receiving the indication, automatically charging, by a device, the consumer for the music selection.

2. The method of claim 1 wherein the automatically charging is done electronically.

3. The method of claim 1, wherein the music sharing system is a peer-to-peer music sharing system, the method further comprising:
    providing a mechanism for the consumer to request said music selection while at a website of said peer-to-peer music sharing system.

4. The method of claim 3 further comprising:
    paying an operator of said peer-to-peer music sharing system for advertising and making music available for transmission to the intermediate storage medium.

5. The method of claim 3 further comprising:
    creating a profile from consumer preference information provided by said peer-to-peer music sharing system.

6. The method of claim 1 further comprising:
    transmitting to the consumer site, for storage on a storage medium at the consumer site, information identifying music selections available for transmission to the intermediate storage medium.

7. The method of claim 6 further comprising:
    before automatically charging the consumer for the music selection, receiving an indication that the entire music selection has been recorded on the permanent storage medium.

8. The method of claim 7, further comprising:
    communicating an order of said music selection to a central controller;
    transferring copies of records of said order to a transmission scheduler;
    communicating schedules created by said transmission scheduler to a satellite uplink facility for transmission of said order; and
    transmitting via satellite said order to said consumer site.

9. The method of claim 8, wherein said order communication comprises:
    an action selected from the group consisting of: using a home personal computer for ordering said music selection, using a cell phone for ordering said music selection, using a Personal Data Assistant wireless device for ordering said music selection; ordering said music selection via wireless application protocol.

10. The method of claim 1, further comprising:
    transmitting pricing information for the music selection to a consumer station located at the consumer site; and
    periodically transmitting updated pricing information for the music selection to the consumer station;
    wherein the automatically charging the consumer for the music selection is done in accordance with the updated pricing information.

11. The method of claim 1, wherein the indication within the catalog comprises either a highlight or an icon.

12. A computer readable storage medium having computer executable instructions stored thereon, the instructions comprising:
    instructions to transmit an indication to a consumer station that a music selection is available for transmission to an intermediate storage medium at a consumer site via a music sharing system, wherein the consumer station is configured to display an indication within a catalog of the music sharing system that the music selection is available for transmission to the intermediate storage medium;
    instructions to receive a consumer request for the music selection, wherein the consumer station is further configured to send the consumer request in response to a consumer selection of the music selection without
requiring further consumer interaction;
instructions to transmit, responsive to receiving the consumer request, the music selection to the intermediate storage medium;
instructions to receive an indication that at least a portion of the music selection has been recorded on the intermediate storage medium and subsequently recorded on a permanent storage medium located at the consumer site; and
instructions to automatically charge, responsive to receiving said indication, the consumer for the music selection.

13. The computer readable medium of claim 12, wherein the instructions to automatically charge comprise instructions to automatically charge electronically.

14. The computer readable medium of claim 12, wherein the music sharing system is a peer-to-peer music sharing system, the instructions further comprising:
instructions to provide a mechanism for the consumer to request said music selection while at a website of said peer-to-peer music sharing system.

15. The computer readable medium of claim 14, the instructions further comprising:
instructions to pay an operator of said peer-to-peer music sharing system for advertising and making music available for transmission to the intermediate storage medium.

16. The computer readable of medium claim 14, the instructions further comprising:
instructions to create a profile from consumer preference information provided by said peer-to-peer music sharing system.

17. The computer readable of medium claim 12, the instructions further comprising:
instructions to transmit to the consumer site, for storage on a storage medium at the consumer site, information identifying music selections available for transmission to the intermediate storage medium.

18. The computer readable of medium claim 17, the instructions further comprising:
instructions to, before automatically charging the consumer for the music selection, receive an indication that the entire music selection has been recorded on the permanent storage medium.

19. The computer readable of medium claim 18, the instructions further comprising:
instructions to communicate an order of said music selection to a central controller;
instructions to transfer copies of records of said order to a transmission scheduler;
instructions to communicate schedules created by said transmission scheduler to a satellite uplink facility for transmission of said order; and
instructions to transmit via satellite said order to said consumer site.

20. The computer readable of medium claim 19, wherein said order communication comprises an action selected from the group consisting of: using a home personal computer for ordering said music selection, using a cell phone for ordering said music selection, using a Personal Data Assistant wireless device for ordering said music selection; ordering said music selection via wireless application protocol.

21. The computer readable medium of claim 12, further comprising:
instructions to transmit pricing information for the music selection to a consumer station located at the consumer site; and
instructions to periodically transmit updated pricing information for the music selection to the consumer station;
wherein the automatically charging the consumer for the music selection is done in accordance with the updated pricing information.

22. The computer readable medium of claim 12, wherein the indication within the catalog comprises either a highlight or an icon.

23. An apparatus comprising:
means for transmitting an indication to a consumer station that a music selection is available for transmission to an intermediate storage medium at a consumer site via a music sharing system, wherein the consumer station is configured to display an indication within a catalog of the music sharing system that the music selection is available for transmission to the intermediate storage medium;
means for receiving a consumer request for the music selection, wherein the consumer station is further configured to send the consumer request in response to a consumer selection of the music selection without requiring further consumer interaction;
means for transmitting the music selection, responsive to receiving the consumer request, to the intermediate storage medium; and
a central controller system configured to:
receive an indication that at least a portion of the music selection has been recorded on the intermediate storage medium and subsequently recorded on a permanent storage medium located at the consumer site; and
automatically charge the consumer for the music selection in response to receiving the received indication.

24. The apparatus of claim 23 wherein the central controller system is configured to automatically charge the consumer by automatically charging the consumer electronically.

25. The apparatus of claim 23 further comprising:
means for transmitting to the consumer site information identifying available music selections for recording on the intermediate storage medium.

26. The apparatus of claim 23 further comprising:
means for transmitting, for storage on a storage medium at the consumer site, information identifying music selections available for transmission to the intermediate storage medium.

27. The apparatus of claim 23, wherein the music sharing system is a peer-to-peer music sharing system.

28. The apparatus of claim 23, further comprising:
means for transmitting pricing information for the music selection to a consumer station located at the consumer site; and
means for periodically transmitting updated pricing information for the music selection to the consumer station;
wherein the automatically charging the consumer for the music selection is done in accordance with the updated pricing information.

29. The apparatus of claim 23, wherein the indication within the catalog comprises either a highlight or an icon.

* * * * *

UNITED STATES PATENT AND TRADEMARK OFFICE
CERTIFICATE OF CORRECTION

| | | |
|---|---|---|
| PATENT NO. | : 8,090,619 B1 | Page 1 of 2 |
| APPLICATION NO. | : 09/707273 | |
| DATED | : January 3, 2012 | |
| INVENTOR(S) | : Hunter et al. | |

It is certified that error appears in the above-identified patent and that said Letters Patent is hereby corrected as shown below:

On the Title Page, in Field (74), under "Attorney, Agent, or Firm", in Column 2, Line 1, delete "Washbum" and insert -- Washburn --, therefor.

Title Page 4, in Field (56), under "U.S. PATENT DOCUMENTS", in Column 1, Line 66, delete "5/51" and insert -- 705/51 --, therefor.

Title Page 4, in Field (56), under "U.S. PATENT DOCUMENTS", in Column 1, Line 71, delete "5/26" and insert -- 705/26 --, therefor.

Title Page 5, in Field (56), under "OTHER PUBLICATIONS", in Column 2, Line 2, delete "contentkeyjsp," and insert -- contentkey.jsp, --, therefor.

In Column 9, Line 37, delete "=other" and insert -- other --, therefor.

In Column 11, Line 17, delete "for." and insert -- for --, therefor.

In Column 11, Line 41, delete "Gigabytes" and insert -- 8 Gigabytes --, therefor.

In Column 12, Line 54, delete "twenty-artists" and insert -- twenty artists --, therefor.

In Column 14, Line 5, delete "LA typically" and insert -- typically --, therefor.

In Column 25, Line 28, in Claim 16, delete "of medium" and insert -- medium of --, therefor.

In Column 25, Line 33, in Claim 17, delete "of medium" and insert -- medium of --, therefor.

In Column 25, Line 39, in Claim 18, delete "of medium" and insert -- medium of --, therefor.

Signed and Sealed this
Seventeenth Day of July, 2012

David J. Kappos
*Director of the United States Patent and Trademark Office*

CERTIFICATE OF CORRECTION (continued)
U.S. Pat. No. 8,090,619 B1

In Column 25, Line 44, in Claim 19, delete "of medium" and insert -- medium of --, therefor.

In Column 25, Line 55, in Claim 20, delete "of medium" and insert -- medium of --, therefor.